United States Patent

Kubota et al.

[11] Patent Number: 5,763,868
[45] Date of Patent: Jun. 9, 1998

[54] OPTICAL CARD

[75] Inventors: Takeshi Kubota; Hiroyuki Yamaguchi; Hideo Yabuhara, all of Tokyo-To, Japan

[73] Assignee: Dai Nippon Printing Co., Ltd., Japan

[21] Appl. No.: 505,525

[22] Filed: Jul. 25, 1995

[30] Foreign Application Priority Data

| Jul. 25, 1994 | [JP] | Japan | 6-192269 |
| Aug. 5, 1994 | [JP] | Japan | 6-203012 |
| Nov. 4, 1994 | [JP] | Japan | 6-270084 |
| Nov. 9, 1994 | [JP] | Japan | 6-275286 |

[51] Int. Cl.$^6$ ................................. G06K 19/00
[52] U.S. Cl. ........................ 235/487; 235/488
[58] Field of Search ................ 235/487, 488, 235/492, 454

[56] References Cited

U.S. PATENT DOCUMENTS

| 4,754,128 | 6/1988 | Takeda | 235/488 |
| 4,812,633 | 3/1989 | Vogelgesang | 235/487 |
| 4,990,759 | 2/1991 | Gloton | 235/492 |
| 5,013,900 | 5/1991 | Hoppe | 235/492 |
| 5,208,450 | 5/1993 | Uenishi | 235/492 |
| 5,270,526 | 12/1993 | Yoshihara | 235/487 |
| 5,432,329 | 7/1995 | O'Boyle | 235/487 |

FOREIGN PATENT DOCUMENTS

A-2 267 683  12/1993  United Kingdom.

WO-A-89/10269  2/1989  WIPO.

OTHER PUBLICATIONS

Patent Abstracts of Japan, vol. 16, No. 434 (M-1308), 10 Sep. 1992 & JP-A-41 048 999, May 1992 Abstract.

Patent Abstracts of Japan, vol. 17, No. 126 (M-1381) 17 Mar. 1993 & JP-A-43 007297, 29 Oct. 1992 Abstract.

Patent Abstracts of Japan, vol. 16, No. 396 (P-1407) 21 Aug. 1992 & JP-A-41 029 077, 30 Apr. 1992 Abstract.

*Primary Examiner*—Donald T. Hajec
*Assistant Examiner*—Karl Frech
*Attorney, Agent, or Firm*—Parkhurst & Wendel, L.L.P

[57] ABSTRACT

An optical card including a card substrate having a recess, and an optical recording member including, in the following order, a surface hard layer, a transparent protective layer, a pattern layer, and an optical recording material layer. The optical recording member is embedded in the recess through an adhesive layer so that the optical recording material layer is in contact with the adhesive layer. The end face of the optical recording member and the side face of the recess of the card substrate respectively have particular tapers facing each other. The optical recording member is embedded in the recess of the card substrate so that the end face of the optical recording member is not exposed from the card substrate.

10 Claims, 20 Drawing Sheets

OPTICAL CARD

BACKGROUND OF THE INVENTION

The present invention relates to an optical information recording medium, particularly an optical card which can be used in credit cards, debit cards, cards for medical data, and the like.

Regarding recording media in a card form, optical cards having a higher storage capacity than magnetic cards and IC cards have hitherto been developed in the art. Recording systems in the optical cards include ROM, write-once read-many, and erasable recording systems, and recording media and constructions for each recording system have been studied. One of these known optical cards is an optical card which comprises an optical recording member embedded in an island form in a card substrate (see, for example, Japanese Utility Model Publication No. 22299/1990).

In case of the conventional embedded optical card, the end face of the optical recording member and the side face of the recess of the card substrate in which the optical recording member is embedded are normal to the card face. Therefore, in order to properly fit the optical recording member into the recess of the card substrate, it is necessary to provide a certain gap between the edge of the optical recording member and the periphery of the recess. The provision of the above gap results in poor appearance of optical card products. Further, since an adhesive or a pressure-sensitive adhesive is applied to only the bottom face of the optical recording member, stress is created in the side face of the recess upon bending of the card, leading to a possibility of the card crazing or cracking.

Under the above circumstances, the present invention has been made, and an object of the present invention is to provide an optical card having good appearance and high bending strength.

DISCLOSURE OF THE INVENTION

According to a first aspect of the present invention, there is provided an optical card comprising: a card substrate having a recess and an optical recording member comprising, in the following order, a surface hard layer, a transparent protective layer, a pattern layer, and an optical recording material layer.

The optical recording member is embedded in the recess through an adhesive layer so that the optical recording material layer is in contact with the adhesive layer. The end face of the optical recording member and the side face of the recess of the card substrate respectively have outwardly widened tapers facing each other. The optical recording member is embedded in the recess of the card substrate so that the end face of the optical recording member is not exposed from the card substrate.

According to a second aspect of the present invention, there is provided an optical card comprising a card substrate having a recess and an optical recording member comprising, in the following order, a surface hard layer, a transparent protective layer, a pattern layer, and an optical recording material layer. The optical recording member is embedded in the recess through an adhesive layer so that the optical recording material layer is in contact with the adhesive layer.

In each of the end face of the optical recording member and the side face of the recess of the card substrate, one side in the longitudinal direction or both one side in the longitudinal direction and another side adjacent to the one side are tapered outwardly at an angle of $-50°$ to $3°$ to the direction normal to the bottom face of the card, and the other sides are outwardly tapered at an angle of not less than $3°$ to the direction normal to the bottom face of the card. At least a boundary between the side face of the recess of the side in the longitudinal direction is tapered at an angle of not less than $3°$ and the bottom face of the recess among boundaries between the side face of the recess and the bottom face of the recess of the card substrate being is rounded. The optical recording member is embedded in the recess of the card substrate so that the end face of the optical recording member is not exposed from the card substrate.

According to a third aspect of the present invention, there is provided an optical card comprising a card substrate having a recess and an optical recording member comprising, in the following order, a surface hard layer, a transparent protective layer, a pattern layer, and an optical recording material layer. The optical recording member is embedded in the recess through an adhesive layer so that the optical recording material layer is in contact with the adhesive layer.

At least one side in the longitudinal direction of each of the optical recording member and the recess of the card substrate is in a wave form.

According to a fourth aspect of the present invention, there is provided an optical card comprising a card substrate having a recess; and an optical recording member comprising a transparent protective layer, a track pattern provided on the back side of the transparent protective layer, and an optical recording layer laminated so as to cover the track pattern, the optical recording member being embedded in the card substrate through an adhesive layer.

The optical recording member is embedded in a position through which at least one of a center line in the direction of a longer side of the card and a center line in the direction of a shorter side passes.

According to a fifth aspect of the present invention, there is provided an optical card comprising a card substrate and an optical recording member, having a rectangular shape in flat, comprising a transparent protective layer, a track pattern provided on the back side of the transparent protective layer, and an optical recording layer laminated so as to cover the track pattern. The optical recording member is embedded in the card substrate with the surface of the optical recording member exposed from the card substrate.

The transparent protective layer is provided with a rib portion at least on both sides thereof in the longitudinal direction with the rib portions being dropped in level from the top surface of a protrusion constituting the transparent protective layer except for the rib portion. The optical recording member is embedded and adhesive-fixed in the card substrate so that a part of the card substrate covers the rib portions and the surface of the protrusion excluding the rib portions is exposed from the card substrate.

According to a sixth aspect of the present invention, there is provided a process for producing an optical card, comprising the steps of:

preparing a back sheet and a top sheet for constituting the card substrate;

forming, in the back sheet, a recess in which the rib portions and a portion in a lower position than the rib portions of the optical recording member are to be embedded and forming, in the top sheet having the same thickness as the protrusion, an opening having a size corresponding to the protrusion; and adhesive-fixing or fitting the optical recording member into the recess of the back sheet, putting the top sheet on top of the back sheet so as for the protrusion of the optical recording member to be fitted into the opening, and joining and integrating the back sheet with the top sheet by bonding or heat fusing, thereby preparing an optical card.

According to a further aspect of the present invention, there is provided a process for producing an optical card, comprising the steps of:

preparing a back sheet, an intermediate sheet, and a top sheet for constituting the card substrate;

forming, in the intermediate sheet having the same thickness as the rib portions, an opening having a size suitable for fitting the rib portions thereinto and forming, in the top sheet having the same thickness as the protrusion of the optical recording member, an opening having a size corresponding to the protrusion;

putting the back sheet and the intermediate sheet on top of the other and fitting the optical recording member into a recess defined by the opening of the intermediate sheet; and putting the top sheet on top of the intermediate sheet so as for the protrusion of the optical recording member to be fitted into the opening of the top sheet and joining and integrating the elements with one another by bonding or heat fusing, thereby preparing an optical card.

According to a further aspect of the present invention, there is provided a process for producing an optical card, comprising the steps of:

preparing a back sheet and a top sheet for constituting the card substrate;

forming, in the top sheet having the same thickness as the optical recording member, a stepped opening into which the optical recording member is to be fitted from the back side of the top sheet;

adhesive-fixing the optical recording member into the opening; and laminating the back sheet onto the back side of the top sheet to prepare an optical card.

BRIEF DESCRIPTION OF THE INVENTION

Figures 15A, 15B, 15C, 15D, 15E, 15F, 15G:
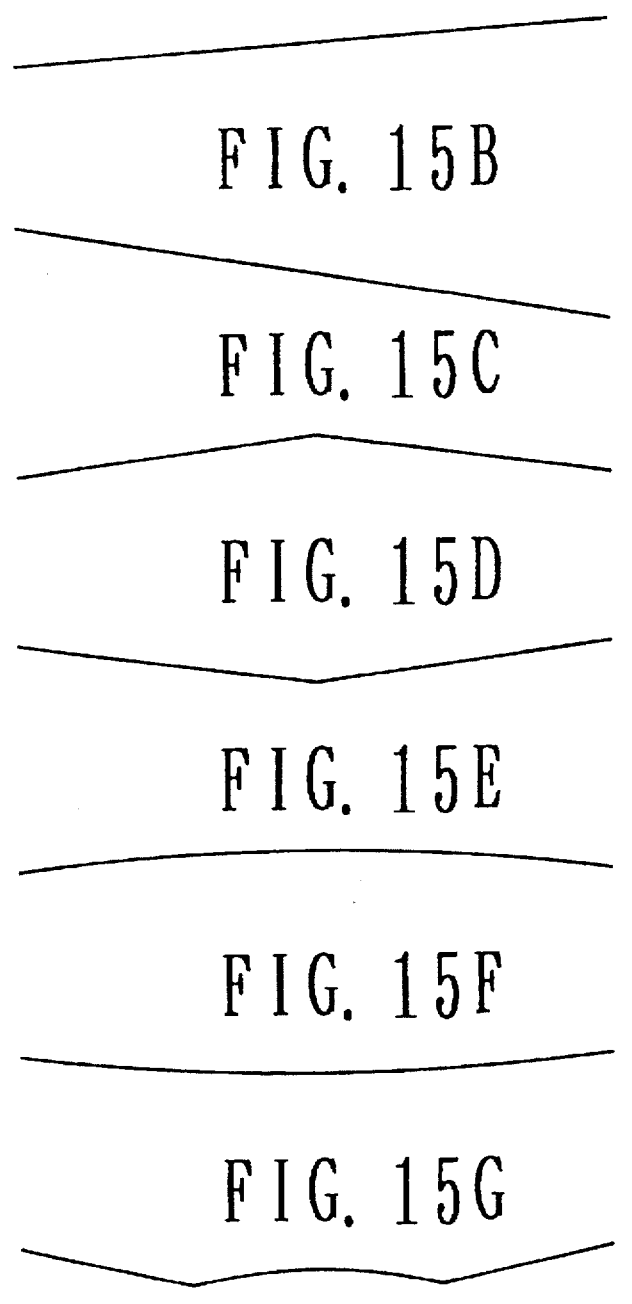

FIGS. 15A to 15G are diagrams showing further embodiments of the form;

BEST MODE FOR CARRYING OUT THE INVENTION

Each aspect of the present invention will now be described in detail.

First Aspect of Invention

Figure 1:
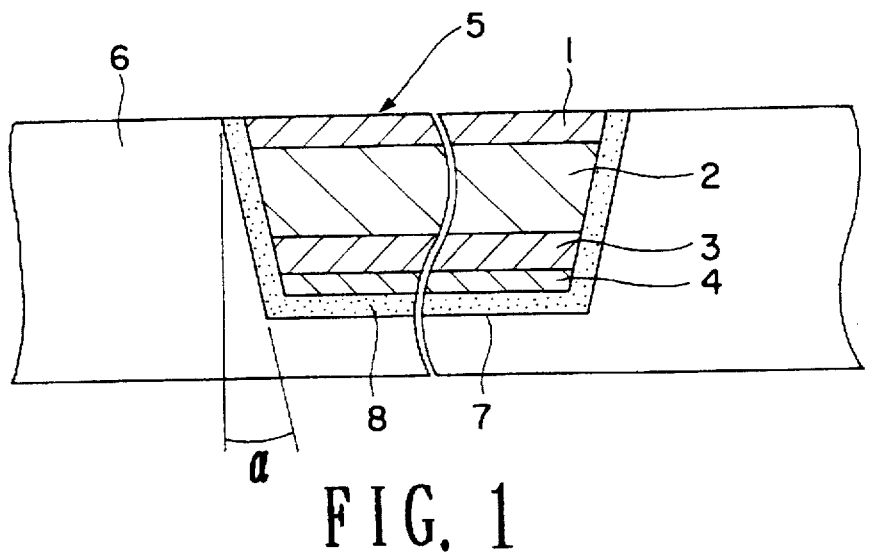
FIG. 1 is a partly enlarged sectional view of an optical card according to the present invention.

As shown in FIG. 1 (cross-sectional view), the optical card according to the first aspect of the present invention comprises card substrate 6 having a recess 7, and an optical recording member 5 comprising, in the following order, a surface hard layer 1, a transparent protective layer 2, a pattern layer 3, and an optical recording material layer 4. The optical recording member 5 is embedded in the recess 7 through an adhesive layer 8, wherein the end face of the optical recording member 5 and the side face of the recess of the card substrate 6 respectively have outwardly widened tapers facing each other and the optical recording member 5 is embedded in the recess 7 of the card substrate 6 so that the end face of the optical recording member 5 is not exposed from the card substrate 6.

The end face of the optical recording member 5 and the side face of the recess of the card substrate 6 each are tapered at an angle α of 3° to 50° to the direction normal to the surface of the card. When the taper angle α is less than 3°, it is difficult to fit the optical recording member 5 into the recess 7 of the card substrate 6. On the other hand, when the taper angle α exceeds 50°, the position of the optical recording member 5 is deviated from the contemplated position, rendering exact positioning of the optical recording member 5 difficult.

In order to enhance the bending strength of the card, the adhesive layer 8 between the optical recording member 5 and the card substrate 6 is preferably provided on the end face as well as on the bottom face of the optical recording member 5.

Methods for forming the optical recording member having a tapered end face and the card substrate provided with a recess having a tapered side face corresponding to the tapered end face of the optical recording member can be classified roughly into two methods. The first method is to form the end face of the optical recording member and the recess of the card substrate by cutting, and the second method is to form the optical recording member and the card substrate by injection or cast molding.

In the first method, an optical recording member is first prepared by forming a surface hard layer on one side of a transparent protective layer and forming a pattern layer and an optical recording material layer on the other side of the transparent protective layer remote from the surface hard layer, and cutting is carried out so that the end face of the optical recording member is tapered at an angle of 3°–50°. In the cutting, a protective layer is provided in order to avoid damage to the optical recording material layer. The protective layer may be formed of a material having no adverse effect on the optical recording material layer, such as an acrylic, vinyl chloride, or polyester material. When a protective film is used, there is no need to provide the protective layer.

It is important for the transparent protective layer to be formed of a material which is less likely to exhibit birefringence. Suitable materials for the transparent protective layer include polycarbonate (PC), polymethyl methacrylate (PMMA), acrylonitrile/styrene copolymer (AS), cellulose propionate (CP), cellulose acetate butyrate (CAB), polyvinyl chloride (PVC), and polyesters. Among them, an about 400 µm-thick polycarbonate (PC) layer is preferred.

The surface hard layer provided on one side of the transparent protective layer is suitably formed of an acrylic UV-curable hard coating agent. Other hard coating agents, such as melamine and silicone hard coating agents, may also be used. Preferably, the hard coating agent has excellent temperature and moisture resistance and hardness high enough to cause no cracking upon bending of the card.

The pattern layer on the other side of the transparent protective layer remote from the surface hard layer may be generally formed by 2P method (photo polymer method), injection, casting, or other known methods. When the pattern is formed by the 2P method, the resin used is a UV-curable resin. On the other hand, when the pattern is formed by the injection or casting method, the resin used is the same as that used in the transparent protective layer. The pattern layer is formed closely although a gutter for cutting is provided. This is for effectively using the optical recording material.

The optical recording material layer may be formed of a commonly used metallic optical recording material, such as a tellurium- or bismuth-based material. It may also be formed of a dye optical recording material, such as phthalocyanine- or naphthoquinone-based recording material. The optical recording material layer may be of ROM type as well as write-once read-many type.

Separately, a recess in which the optical recording member is to be embedded is formed by cutting (counter sinking) in such a manner that the taper of the side face of the recess corresponds to that of the end face of the optical recording member. In this case, in order to make the recess parallel to the card edge, cutting of the edge of the card substrate is carried out simultaneously with the counter sinking.

The card substrate is formed of polyvinyl chloride, ABS resin or the like. In the case of the card substrate formed of polyvinyl chloride, a four-layer structure of 0.10/0.28/0.28/0.10 mm, 0.05/0.37/0.37/0.05 mm or the like is suitable. 0.10 mm-thick polyvinyl chloride and 0.05 mm thick polyvinyl chloride are transparent. On the other hand, 0.28 mm-thick polyvinyl chloride and 0.37 mm-thick polyvinyl chloride are pearlescent. In order to enhance the abrasion resistance of a print, printing is carried out on one side of the pearlescent polyvinyl chloride.

The optical recording member is fixed into the recess of the card substrate with an adhesive. Known adhesives, such as urethane, epoxy, acrylic, vinyl, and amide adhesives, may be used for this purpose. Since, however, the adhesive comes into direct contact with the optical recording material layer, it preferably has high recording sensitivity and excellent temperature and moisture resistance. The fixation with the adhesive is carried out by dropping an UV-curable adhesive in the recess of the card substrate, fitting the optical recording member into the recess, pressing the optical recording member by means of a flat press having a size equal to that of the optical recording member, and applying ultraviolet light to the resultant assembly to adhere the optical recording member to the card substrate. Alternatively, it is also possible to use a method which comprises previously applying a hot-melt adhesive to the optical recording member through a T-die, fitting the optical recording member into the recess, and hot-pressing the optical recording member by means of a flat press or a roll press. Other methods may also be used. In all the above methods, pressing conditions are set so that the adhesive is spread between the end face of the optical recording member and the side face of the recess of the card substrate. When a pressure-sensitive adhesive is used for fixing the optical recording member into the recess of the card substrate, a pressure-sensitive adhesive double coated tape may be used.

In another embodiment of the first method, an optical recording member comprising a transparent protective layer, a surface hard layer provided on one side of the transparent protective layer, and a pattern layer and an optical recording material layer provided on the other side of the transparent protective layer remote from the surface hard layer is prepared, a plastic hot-melt adhesive is coated onto the optical recording material layer, the optical recording member with an adhesive layer laminated thereon is tapered by cutting so that the taper angle of the end face of the optical recording member is 3° to 50°, the optical recording member is fitted into the recess of the card substrate, and bonding is carried out by hot pressing by taking advantage of heat from a flat press or a roll press. In this case, pressing conditions are set so that the adhesive is melted and spread between the end face of the optical recording member and the side face of the recess of the card substrate.

In the second method, a transparent protective layer having a pattern is prepared using polycarbonate, acrylic, or other resins by injection or cast molding commonly known in the art. In this case, molding is carried out so that the end face of the transparent protective layer is tapered at an angle of 3° to 50°. Then, a surface hard layer is formed on the side of the transparent protective layer remote from the pattern, and an optical recording material layer is formed on the pattern face. The surface hard layer and the optical recording material layer may be the same as those described above. Separately, a card substrate is prepared using ABS, polyvinyl chloride, or other resins by injection or cast molding. At that time, a recess into which the optical recording member is to be fitted is formed. In this case, molding is carried out so that the taper angle of the side face of the recess is the same as that of the end face of the optical recording member. A design is provided by in-mold decorating. The optical recording member is fixed into the recess of the card substrate by means of an adhesive or a pressure-sensitive adhesive in the same manner as described above.

Figure 2:
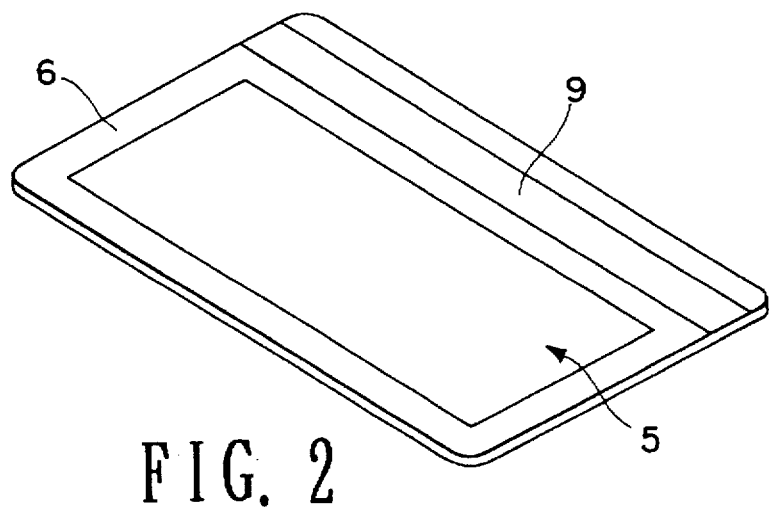
FIG. 2 is a perspective view of one embodiment of an optical card provided with a magnetic stripe on the same side as that where an optical recording material is provided.
Figure 3:
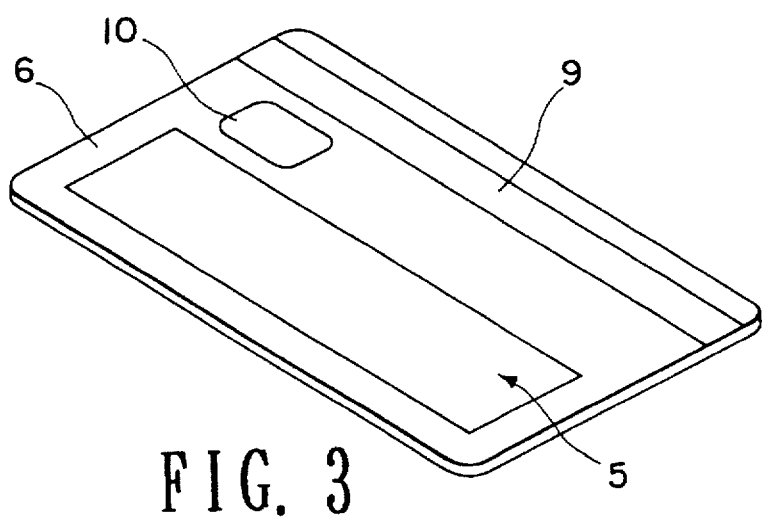
FIG. 3 is a perspective view of one embodiment of an optical card provided with an IC module on the same side as that where an optical recording material is provided.
Figure 4A:
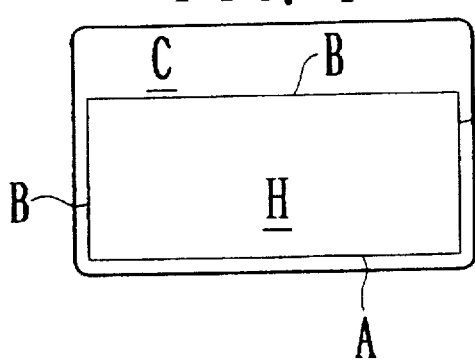
FIGS. 4A–4F is a plan view illustrating an embodiment of the layout of an optical recording member.
Figure 4B:
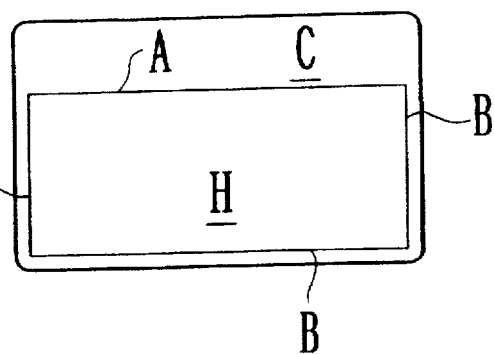
Figure 4C:
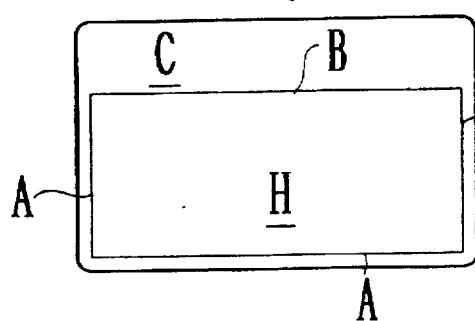
Figure 4D:
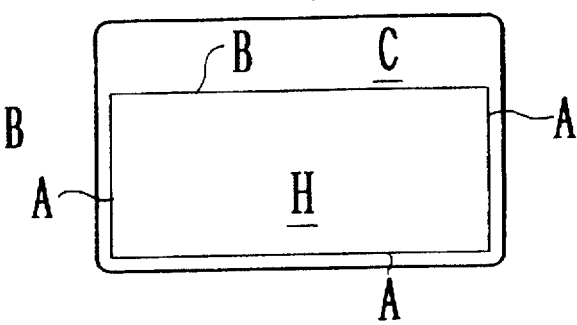
Figure 4E:
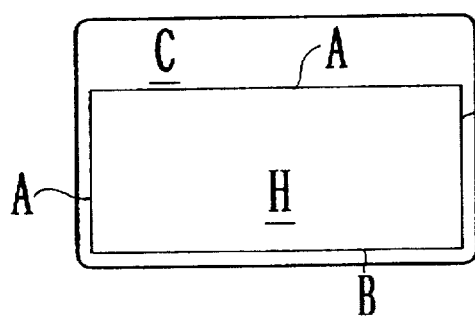
Figure 4F:
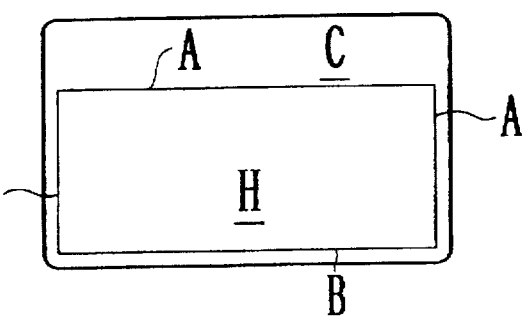

In order to diversify the use of the card, as shown in FIGS. 2 and 3, a magnetic stripe 9 may be provided on one side of the card substrate 6, which is the same as or opposite to the side where the optical recording member 5 is provided, or both sides of the card substrate 6, and an IC module 10 may be provided on one side of the card substrate 6 which is the same as or opposite to the side where the optical recording member 5 is provided.

A further embodiment of the method for producing the embedded optical card will now be described (the following methods may be applied also to the optical cards according to the second to fifth aspects of the present invention which will be described later).

Matching of skew (parallelism between card edge and optical recording track) can be carried out by the following methods.

Method 1:

At the outset, a card substrate having a size larger than the actual size is prepared. In this case, the formation of a recess and the preparation of an optical recording member can be carried out by either injection molding or cutting.

Then, the optical recording member is embedded in the recess of the card substrate. A card having a predetermined shape is punched out based on the embedded position of the optical recording member to match the skew.

Method 2:

In the case of cutting, at the time of preparation of a card substrate, the step of punching and the step of provision of a recess by cutting are carried out uniaxially. In this case, "uniaxially" used herein includes cutting with one or two cutters without refixation after the step of punching the card. This method can minimize the difference in parallelism between the card edge and the recess.

The optical recording member can be fixed into the recess with an adhesive or the like by the following methods.

(i) Fixation with a double-coated tape.

(ii) Fixation with a hot-melt film adhesive.

(iii) Coating of a hot-melt adhesive on the optical recording member or the recess of the card substrate through a T-die or the like followed by joining and fixation of the optical recording member into the recess.

(iv) Fixation with a UV-curable adhesive.

Further, in the fixation of the optical recording member into the recess with an adhesive as described above, the use of a laminator, local pressing, or pressing of the elements including the card substrate by hot pressing is preferably adopted in order to avoid inclusion of air bubbles in the adhesive layer.

Second Aspect of Invention

The optical card according to the second aspect of the present invention comprises a card substrate provided with a recess having a rectangular shape in flat, and an optical recording member comprising, in the following order, a surface hard layer, a transparent protective layer, a pattern layer, and an optical recording material layer. The optical recording member is embedded in the recess through an adhesive layer. In each of the end face of the optical recording member and the side face of the recess of the card substrate, one side in the longitudinal direction or both one side in the longitudinal direction and another side adjacent to the one side are tapered outwardly at an angle of −50° to 3° to the direction normal to the bottom face of the card, and the other sides are tapered outwardly at an angle of not less than 3° to the direction normal to the bottom face of the card. At least a boundary between the side face of the recess of the side in the longitudinal direction tapered at an angle of not less than 3° and the bottom face of the recess among boundaries between the side face of the recess and the bottom face of the recess of the card substrate is rounded, and the optical recording member is embedded in the recess of the card substrate so that the end face of the optical recording member is not exposed from the card substrate.

The rounding is preferably in the form of a circular arc having a radius of curvature of 0.2 to 10 mm. Further, in order to enhance the bending strength of the card, the adhesive layer between the optical recording member and the card substrate is preferably provided on the end face of the optical recording member as well as on the bottom face of the optical recording member.

When the card substrate and the optical recording member are represented respectively by C and H with the side tapered at an angle of −50° to 3° and the side tapered at an angle of not less than 3° being represented respectively by A and B, six combinations of the side A with the side B as shown in FIGS. 4A to 4F can be adopted. In the side B in the longitudinal direction of the optical recording member, the boundary between the side face of the recess and the bottom face of the recess is rounded, while in the other sides, the boundary between the side face of the recess and the bottom face of the recess may be rounded or not be rounded. In this case, since the bending stress of the card is concentrated at the center of the card, among the sides in the longitudinal direction, the side B tapered at an angle of not less than 3° is preferably positioned near the center of the card substrate C from the viewpoint of bending strength.

The reason why the taper angles of the sides A and B are limited to the above respective ranges are as follows. Specifically, when the taper angle in the side A is less than −50°, it is difficult to fit the optical recording member into the recess, while when it exceeds 3°, the position of the optical recording member is likely to deviate from the contemplated position, resulting in lowered positional accuracy. When the taper angle in the side B is less than 3°, it is difficult to fit the optical recording member into the recess and, at the same time, the stress concentration occurs upon bending of the card. In connection with the provision of a taper in the side B at an angle of not less than 3°, the taper is preferably provided so as not to deteriorate the appearance of the card.

Methods for forming the optical recording member having a tapered end face and the card substrate provided with a recess having a tapered side face corresponding to the tapered end face of the optical recording member can be classified roughly into two methods. The first method is to form the end face of the optical recording member and the recess of the card substrate by cutting, and the second method is to form the optical recording member and the card substrate by injection or cast molding.

In the first method, an optical recording member is first prepared by forming a surface hard layer on one side of the transparent protective layer and forming a pattern layer and an optical recording material layer on the other side of the transparent protective layer remote from the surface hard layer, and cutting is carried out so that the end face of the optical recording member is tapered at a predetermined angle and, if necessary, the lower part of a predetermined end face(s) is rounded. In the cutting, a protective layer is provided in order to avoid damage to the optical recording material layer. The protective layer may be formed of a material having no adverse effect on the optical recording material layer, such as an acrylic, vinyl chloride, or polyester material. When a protective film is used, there is no need to provide the protective layer.

It is important for the transparent protective layer to be formed of a material which is less likely to exhibit birefringence. Suitable materials for the transparent protective layer include polycarbonate (PC), polymethyl methacrylate (PMMA), acrylonitrile/styrene copolymer (AS), cellulose propionate (CP), cellulose acetate butyrate (CAB), polyvinyl chloride (PVC), and polyesters. Among them, an about 400 μm-thick polycarbonate (PC) layer is preferred.

The surface hard layer provided on one side of the transparent protective layer is suitably formed of an acrylic UV-curable hard coating agent. Other hard coating agents, such as melamine and silicone hard coating agents, may also be used. Preferably, the hard coating agent has excellent temperature and moisture resistance and hardness high enough to cause no cracking upon bending.

The pattern layer on the other side of the transparent protective layer remote from the surface hard layer may be generally formed by 2P method, injection, casting, or other known methods. When the pattern is formed by the 2P method, the resin used is a UV-curable resin. On the other hand, when the pattern is formed by the injection or casting method, the resin used is the same as that used in the transparent protective layer. The pattern layer is formed closely although a gutter for cutting is provided. This is for effectively using the optical recording material.

The optical recording material layer may be formed of a commonly used metallic optical recording material, such as a tellurium- or bismuth-based material. It may also be formed of a dye optical recording material, such as phthalocyanine- or naphthoquinone-based recording material. The optical recording material layer may be of ROM type as well as write-once read-many type.

Separately, a recess in which the optical recording member is to be embedded is formed by cutting (counter sinking) in such a manner that the taper of the side face of the recess corresponds to that of the end face of the optical recording member and, at the same time, the boundary between a predetermined side face of the recess and a predetermined bottom face of the recess is rounded. In this case, in order to make the recess parallel to the card edge, cutting of the edge of the card substrate is carried out simultaneously with the counter sinking.

The card substrate is formed of polyvinyl chloride, ABS resin or the like. In the case of the card substrate formed of polyvinyl chloride, a four-layer structure of 0.10/0.28/0.28/0.10 mm, 0.05/0.37/0.37/0.05 mm or the like is suitable. 0.10 mm-thick polyvinyl chloride and 0.05 mm thick polyvinyl chloride are transparent. On the other hand, 0.28 mm-thick polyvinyl chloride and 0.37 mm-thick polyvinyl chloride are pearlescent. In order to enhance the abrasion resistance of a print, printing is carried out on one side of the pearlescent polyvinyl chloride.

The optical recording member is fixed into the recess of the card substrate with an adhesive. Known adhesives, such as urethane, epoxy, acrylic, vinyl, and amide adhesives, may be used for this purpose. Since, however, the adhesive comes into direct contact with the optical recording material layer, it preferably has high recording sensitivity and excellent temperature and moisture resistance. The fixation with the adhesive is carried out by dropping an UV-curable adhesive in the recess of the card substrate, fitting the optical recording member into the recess, pressing the optical recording member by means of a flat press having a size equal to that of the optical recording member, and applying ultraviolet light to the resultant assembly to adhere the optical recording member to the card substrate. Alternatively, it is also possible to use a method which comprises previously applying a hot-melt adhesive to the optical recording member through a T-die, fitting the optical recording member into the recess, and hot-pressing the optical recording member by means of a flat press or a roll press. Other methods may also be used. In all the above methods, pressing conditions are set so that the adhesive is spread between the end face of the optical recording member and the side face of the recess of the card substrate. When a pressure-sensitive adhesive is used for fixing the optical recording member into the recess of the card substrate, a pressure-sensitive adhesive double coated tape may be used.

In another embodiment of the first method, an optical recording member comprising a transparent protective layer, a surface hard layer provided on one side of the transparent protective layer, and a pattern layer and an optical recording material layer provided on the other side of the transparent protective layer remote from the surface hard layer is prepared, a plastic hot-melt adhesive is coated onto the optical recording material layer, the optical recording member with an adhesive layer laminated thereon is tapered by cutting so that the end face of the optical recording member is tapered at a predetermined angle and, if necessary, the lower part of a predetermined end face(s) is rounded, the optical recording member is fitted into the recess of the card substrate, and bonding is carried out by hot pressing by taking advantage of heat from a flat press or a roll press. In this case, pressing conditions are set so that the adhesive is melted and spread between the end face of the optical recording member and the side face of the recess of the card substrate.

In the second method, a transparent protective layer having a pattern is prepared using polycarbonate, acrylic, or other resins by injection or cast molding commonly known in the art. In this case, molding is carried out so that the end face of the transparent protective layer is tapered at a predetermined angle and, if necessary, the lower part of a predetermined end face(s) is rounded. Then, a surface hard layer is formed on the side of the transparent protective layer remote from the pattern, and an optical recording material layer is formed on the pattern face. The surface hard layer and the optical recording material layer may be the same as those described above. Separately, a card substrate is prepared using ABS, polyvinyl chloride, or other resins by injection or cast molding. At that time, a recess into which the optical recording member is to be fitted is formed. In this case, molding is carried out so that the taper angle of the side face of the recess is the same as that of the end face of the optical recording member and, at the same time, the boundary between a predetermined side face of the recess and a predetermined bottom face of the recess is rounded. Decoration is carried out by in-mold decorating. The optical recording member is fixed into the recess of the card substrate by means of an adhesive or a pressure-sensitive adhesive in the same manner as described above.

When diversification of the use of the card is contemplated, a magnetic stripe may be provided on one side of the card substrate, which is the same as or opposite to the side where the optical recording member is provided, or both sides of the card substrate, and an IC module may be provided on one side of the card substrate which is the same as or opposite to the side where the optical recording member is provided.

In the optical card having the above construction, when the optical recording member is fitted into the recess of the card substrate, the taper at an angle of −50° to 3° provided in one side in the longitudinal direction serves to facilitate the fitting of the optical recording member into the recess of the card substrate and ensure the positional accuracy in the fitting of the optical recording member into the card substrate with the taper at an angle of not less than 3° provided in the other sides serving to further facilitate the fitting of the optical recording member into the recess of the card substrate. By virtue of this feature, the optical recording member can be fitted into the recess of the card substrate without providing a large gap between the recess of the card substrate and the optical recording member. The rounding at the boundary between the side face of the recess and the bottom face of the recess serves to disperse the stress created by bending of the card.

Third Aspect of Invention

Figure 12:
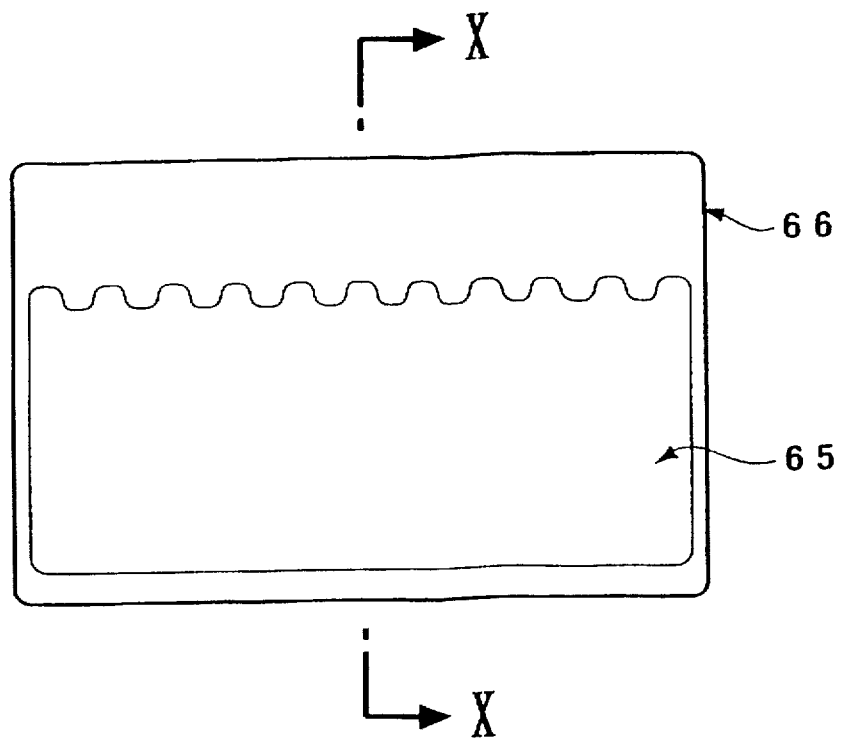
FIG. 12 is a plan view showing a further embodiment of the optical card according to the present invention.
Figure 13:
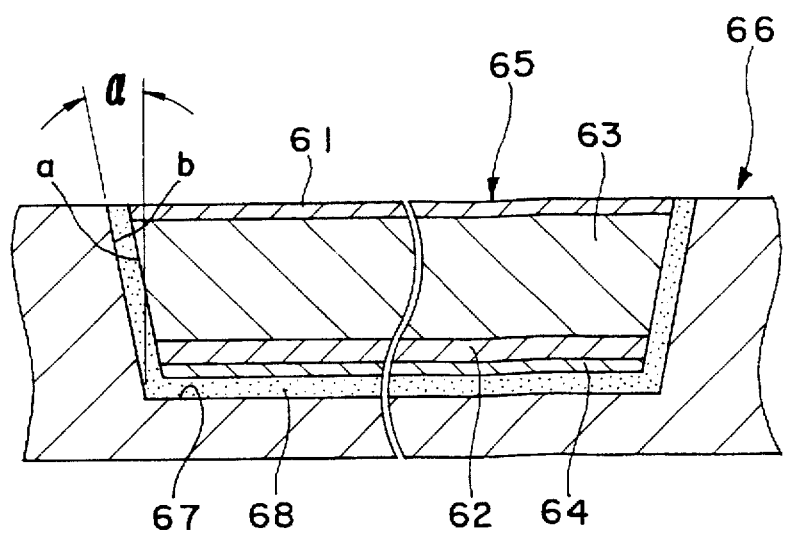
FIG. 13 is a partly enlarged sectional view taken on line X—X of FIG. 12.
Figure 14A:
FIGS. 14A to 14H are diagrams showing embodiments of "wave form" referred to in the present invention.
Figure 14B:
Figure 14C:
Figure 14D:
Figure 14E:
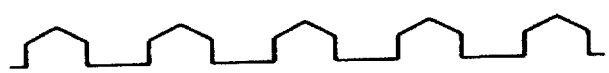
Figure 14F:
Figure 14G:
Figure 14H:

As shown in FIG. 13 (cross-sectional view), the optical card according to the third aspect of the invention comprises the card substrate 66 having a recess 67, and an optical recording member 65 comprising, in the following order from the top, a surface hard layer 61, a transparent protective layer 63 having a track pattern 62 on the underside thereof, and an optical recording material layer 64. The optical recording member 65 is embedded in the recess 67 through an adhesive layer 68. As shown in FIG. 12, at least one side (upper side in case of the embodiment shown in FIG. 12) in the longitudinal direction of each of the optical recording member 65 and the recess 67 of the card substrate 66 being in a wave form.

In the present invention, the term "wave form" is fundamentally intended to mean all possible forms except for a straight line parallel to the longitudinal direction of the card. Specifically, wave forms include those as shown in FIG. 12 and FIGS. 14A to 14H, such as a form consisting of repetition of a semicircle or a part of an ellipse, a form consisting of repetition of a rectangle or other polygons having or not having a round corner, and a sawtooth wave form; those as shown in FIGS. 15A to 15G, such as a straight line inclined toward the longitudinal direction of the card and a curve; and any combination of the above forms.

Preferably, the optical recording member 65 is embedded in the recess 67 of the card substrate 66 in such a manner that the end face a of the optical recording member 65 is not exposed from the surface of the card substrate 66. In this case, the adhesive layer 68 between the optical recording member 65 and the card substrate 66 is preferably provided on the end face as well as the bottom face of the optical recording member 65.

Further, in order to facilitate the fitting of the optical recording member 65 into the recess 67 of the card substrate 66, it is preferred to provide a taper α in the end face a of the optical recording member 65 and the side face b of the recess of the card substrate 66, as shown in FIG. 13. Such taper a is preferably provided in at least each side in the longitudinal direction.

Methods for preparing the above optical recording member 65 and the card substrate 66 can be classified roughly into two methods. The first method is to form the end face of the optical recording member and the recess of the card substrate by cutting, and the second method is to form the optical recording member and the card substrate by injection or cast molding.

In the first method, a plate having a plurality of optical recording members is first prepared each of which comprises a transparent protective layer, a surface hard layer formed on one side of the transparent protective layer, and a layer having a pattern and an optical recording material layer formed on the other side of the transparent protective layer remote from the surface hard layer. This is cut into individual optical recording members having a predetermined size. At least one side in the longitudinal direction of the optical recording member is cut into a wave form. At that time, if necessary, a desired taper is provided in the end face of the optical recording member. In the cutting, a protective layer is provided in order to avoid damage to the optical recording material layer. The protective layer may be formed of a material having no adverse effect on the optical recording material layer, such as an acrylic, vinyl chloride, or polyester material. When a protective film is used, there is no need to provide the protective layer.

It is important for the transparent protective layer to be formed of a material which is less likely to exhibit birefringence. Suitable materials for the transparent protective layer include polycarbonate (PC), polymethyl methacrylate (PMMA), acrylonitrile/styrene copolymer (AS), cellulose propionate (CP), cellulose acetate butyrate (CAB), polyvinyl chloride (PVC), and polyesters. Among them, an about 400 μm-thick polycarbonate (PC) layer is preferred.

The surface hard layer provided on one side of the transparent protective layer is suitably formed of an acrylic UV-curable hard coating agent. Other hard coating agents, such as melamine and silicone hard coating agents, may also be used. Preferably, the hard coating agent has excellent temperature and moisture resistance and hardness high enough to cause no cracking upon bending of the card.

The pattern layer on the other side of the transparent protective layer may be generally formed by 2P method.

injection, casting, or other known methods. When the pattern is formed by the 2P method, the resin used is a UV-curable resin. On the other hand, when the pattern is formed by the injection or casting method, the resin used is the same as that used in the transparent protective layer. The pattern layer is formed closely although a gutter for cutting is provided. This is for effectively using the optical recording material.

The optical recording material layer may be formed of a commonly used metallic optical recording material, such as a tellurium- or bismuth-based material. It may also be formed of a dye optical recording material, such as phthalocyanine- or naphthoquinone-based recording material. The optical recording material layer may be of ROM type as well as write-once read-many type.

Separately, a recess in which the optical recording member is to be embedded is formed by cutting (counter sinking). At that time, at least one side in the longitudinal direction is brought to a wave form corresponding to the form of the optical recording member. In this case, when the optical recording material has a tapered end face, counter sinking is carried out so that the taper of the side face of the recess corresponds to the taper of the end face of the optical recording member. Further, in order to make the recess parallel to the card edge, cutting of the edge of the card substrate 66 is carried out simultaneously with the counter sinking.

The card substrate is formed of polyvinyl chloride, ABS resin or the like. In the case of the card substrate formed of polyvinyl chloride, a four-layer structure of 0.10/0.28/0.28/0.10 mm, 0.05/0.37/0.37/0.05 mm or the like is suitable. 0.10 mm-thick polyvinyl chloride and 0.05 mm-thick polyvinyl chloride are transparent. On the other hand, 0.28 mm-thick polyvinyl chloride and 0.37 mm-thick polyvinyl chloride are pearlescent. In order to enhance the abrasion resistance of a print, printing is carried out on one side of the pearlescent polyvinyl chloride.

The optical recording member is fixed into the recess of the card substrate with an adhesive. Known adhesives, such as urethane, epoxy, acrylic, vinyl, and amide adhesives, may be used for this purpose. Since, however, the adhesive comes into direct contact with the optical recording material layer, it preferably has high recording sensitivity and excellent temperature and moisture resistance. The fixation with the adhesive is carried out by dropping an UV-curable adhesive in the recess of the card substrate, fitting the optical recording member into the recess, pressing the optical recording member by means of a flat press having a size equal to that of the optical recording member, and applying ultraviolet light to the resultant assembly to adhere the optical recording member to the card substrate. Alternatively, it is also possible to use a method which comprises previously applying a hot-melt adhesive to the optical recording member through a T-die, fitting the optical recording member into the recess, and hot-pressing the optical recording member by means of a flat press or a roll press. Other methods may also be used. In all the above methods, pressing conditions are set so that the adhesive is spread between the end face of the optical recording member and the side face of the recess of the card substrate. When a pressure-sensitive adhesive is used for fixing the optical recording member into the recess of the card substrate, a pressure-sensitive adhesive double coated tape may be used.

In another embodiment of the first method, an optical recording member comprising a transparent protective layer, a surface hard layer provided on one side of the transparent protective layer, and a pattern layer and an optical recording material layer provided on the other side of the transparent protective layer is prepared, and a plastic hot-melt adhesive is coated onto the optical recording material layer. A plate having a plurality of optical recording members with an adhesive layer laminated thereon is cut into individual optical recording members which are then subjected to cutting in the same manner as described above. Then, the optical recording member is fitted into the recess of the card substrate, and bonding is carried out by hot pressing by taking advantage of heat from a flat press or a roll press. In this case, pressing conditions are set so that the adhesive is melted and spread between the end face of the optical recording member and the side face of the recess of the card substrate.

In the second method, a transparent protective layer having a pattern is prepared using polycarbonate, acrylic, or other resins by injection or casting commonly known in the art. In this case, at least one side in the longitudinal direction is made wavy, and, if necessary, the whole end face is tapered. Then, a surface hard layer is formed on the side of the transparent protective layer remote from the pattern, and an optical recording material layer is formed on the pattern face. The surface hard layer and the optical recording material layer may be the same as those described above. Separately, a card substrate is prepared using ABS resin, polyvinyl chloride, or other resins by injection or cast molding. At that time, a recess into which the optical recording member is to be fitted is formed. In this case, at least one side in the longitudinal direction is brought to a wave form corresponding to the form of the optical recording member, and, further, when the optical recording member has a tapered end face, a taper corresponding to the end face of the optical recording member is provided in the side face of the recess. A design is provided by in-mold decorating. The optical recording member is fixed into the recess of the card substrate by means of an adhesive or a pressure-sensitive adhesive in the same manner as described above.

Figure 16:
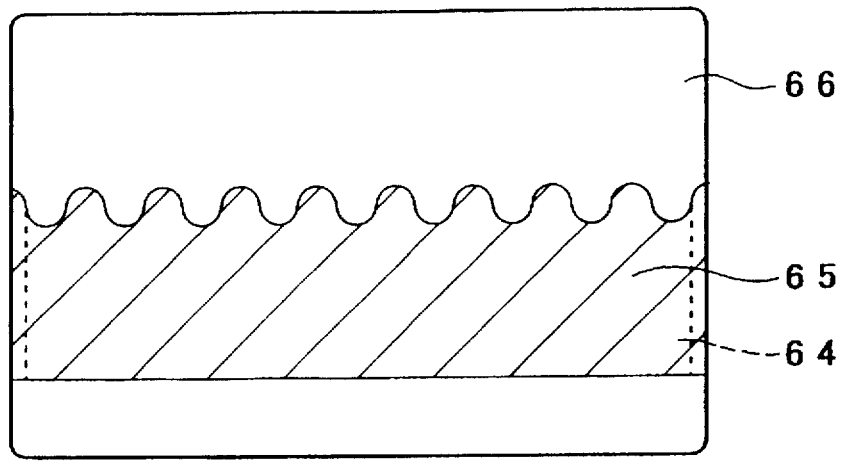
FIG. 16 is a plan view illustrating a further embodiment of the optical card.

In the optical card of the type shown in FIG. 12, the optical recording member 65 is embedded in an island form in the card substrate. It is also possible to use a method wherein, as shown in FIG. 16, the optical recording member 65 is embedded with both ends thereof having a trimmed-off structure. If embedding in this way is used, the recess 67 can be formed in the card substrate 66 by one-pass counter sinking even when the width of the recess 67 is large, enabling the cost to be lowered. It is noted that when $TeO_x$ or the like is used in the optical recording material layer 64, there is a possibility that oxidation starts at both edges of the optical recording member. For this reason, as shown in the hatched region of FIG. 16, no optical recording material layer 64 is preferably provided in the optical recording member in its portions near respective both ends. This offers an additional advantage that the appearance of the resultant card is like that of the card with the optical recording member embedded in an island form.

Figure 17:
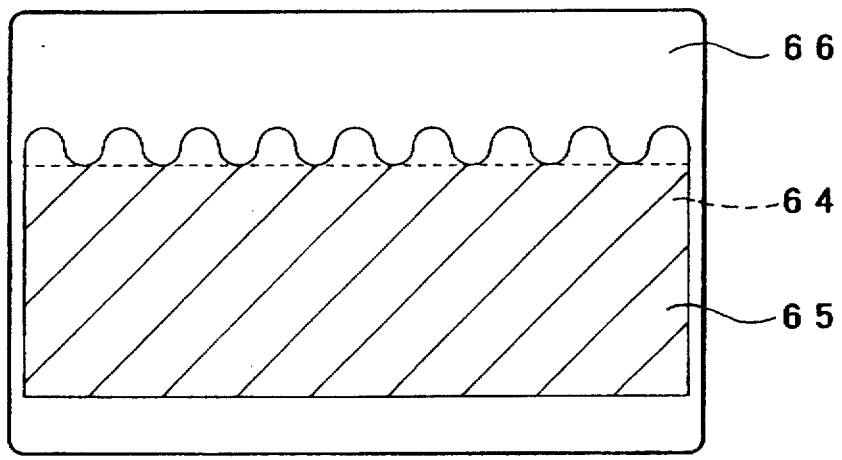
FIG. 17 is a plan view illustrating a further embodiment of the optical card.
Figure 18:
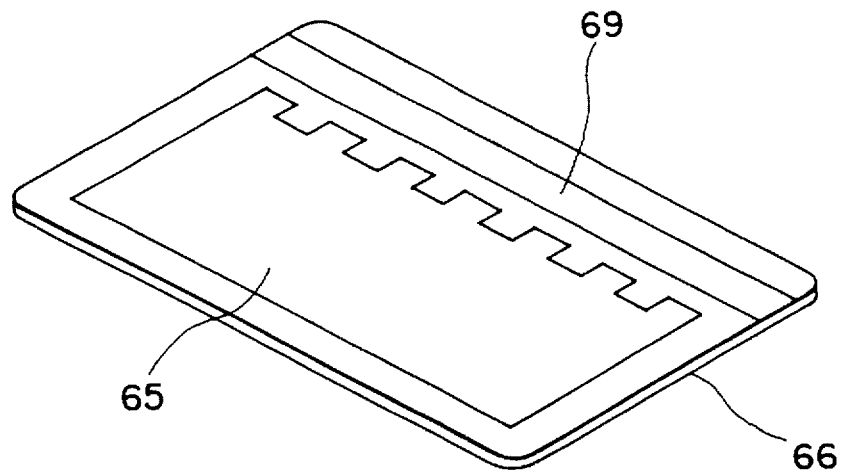
FIG. 18 is a perspective view showing an embodiment of the optical card provided with a magnetic stripe on the same side of the card as that where an optical recording member is provided.
Figure 19:
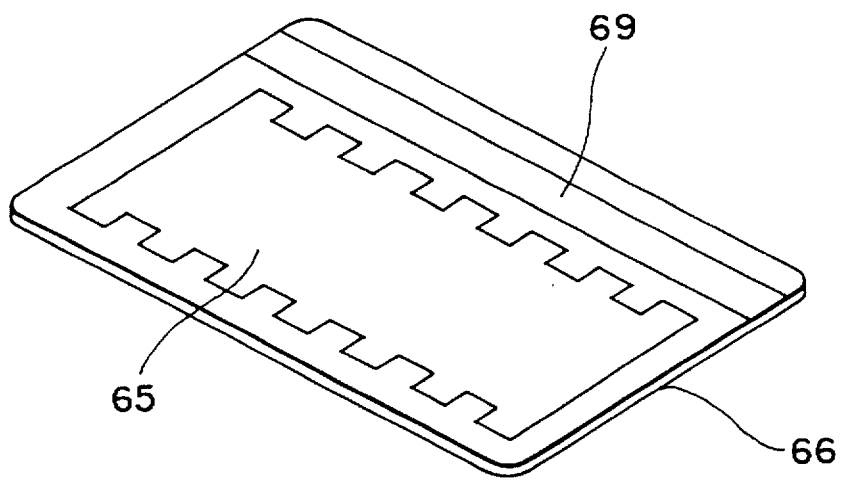
FIG. 19 is a perspective view showing another embodiment of the optical card provided with a magnetic stripe on the same side of the card as that where an optical recording member is provided.
Figure 20:
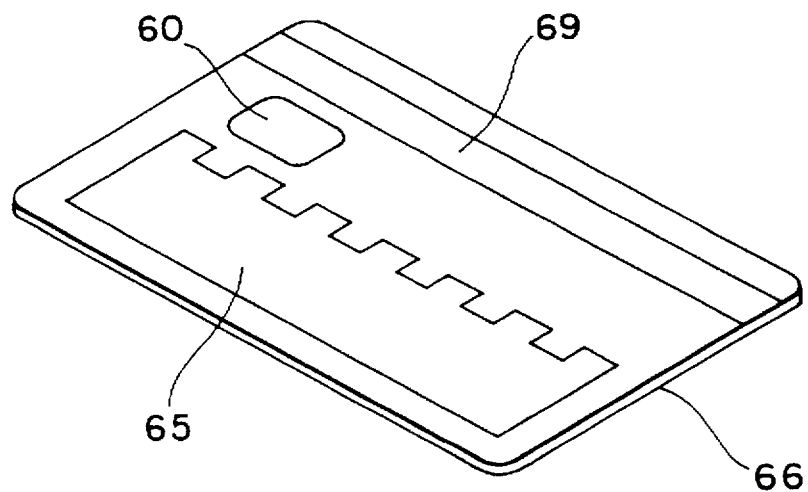
FIG. 20 is a perspective view of one embodiment of the optical card provided with a magnetic stripe and an IC module on the same side of the card as that where an optical recording member is provided.
Figure 21:
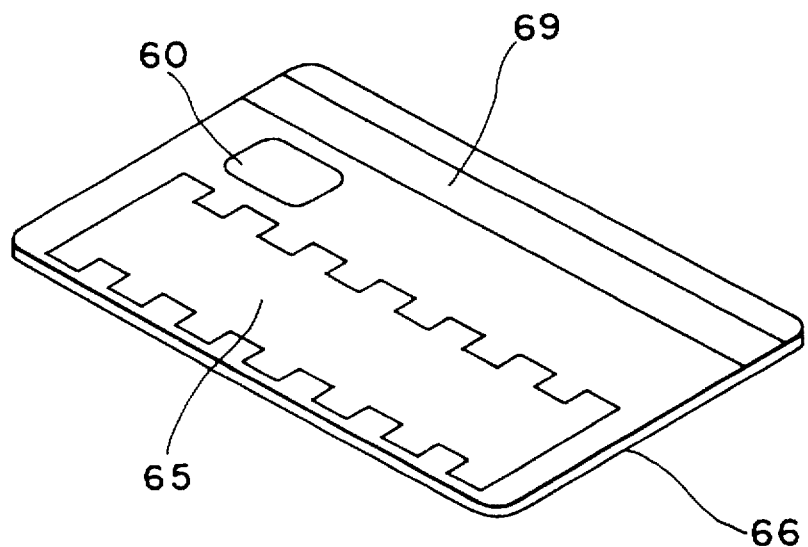
FIG. 21 is a perspective view of another embodiment of the optical card provided with a magnetic stripe and an IC module on the same side of the card as that where an optical recording member is provided.
Figure 22A:
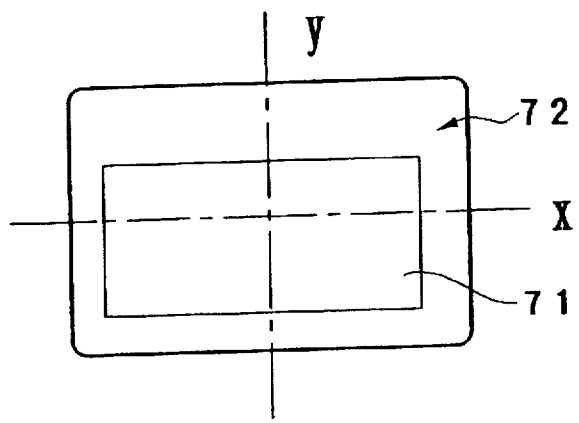
FIGS. 22A to 22D are plan views showing further embodiments of the optical card according to the present invention.
Figure 22B:
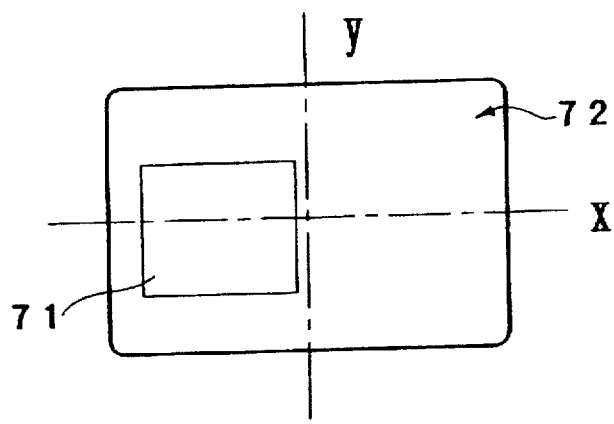
Figure 22C:
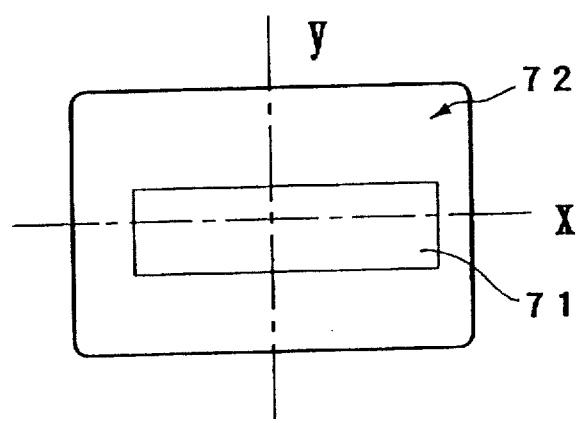
Figure 22D:
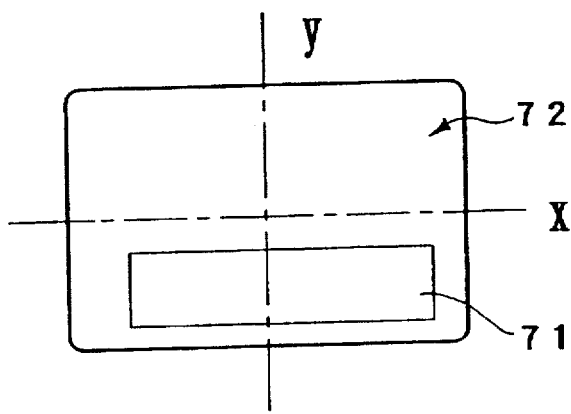

Further, in the optical card of the present invention, the provision of an optical recording material layer may be omitted in an area in a wave form. For example, as shown in the hatched region of FIG. 17, the optical recording material layer 64 is provided in only the area other than the area in a wave form. The track for information recording is provided in the longitudinal direction of the card, and the area in a wave form cannot be used for information recording. Therefore, the information capacity is independently of whether or not the optical recording material layer is provided in the area in a wave form. According to this embodiment, the amount of the expensive optical recording material used can be reduced, and, at the same time, since the area where no optical recording material layer is provided becomes transparent, the boundary between the optical recording material layer and the area in a wave form where no information recording material layer is provided looks like a straight line, making the wave form inconspicuous.

In the optical card of the present invention, in order to diversify the use of the card, as shown in FIGS. 18 to 21, a magnetic stripe 69 may be provided on one side of the card substrate 66, which is the same as or opposite to the side where the optical recording member 65 is provided, or both sides of the card substrate 66, and an IC module 60 may be provided on one side of the card substrate 66 which is the same as or opposite to the side where the optical recording member 65 is provided. Further, it is a matter of course that characters representing information on the cards, such as personal name and registration number, can be formed as a relief of characters by embossing in the area other than that where the optical recording material is present.

According to the optical card of the present invention having the above construction, at least one side in the longitudinal direction in the optical recording member and in the recess of the card substrate in which the optical recording member is embedded are in a wave form. The wave form serves to disperse the stress created upon bending of the card, improving the bending strength.

Fourth Aspect of Invention

As shown in FIGS. 22A to 22D, the optical card according to the fourth aspect of the present invention comprises a card substrate 72 having a recess, and an optical recording member 71 comprising a transparent protective layer, a track pattern provided on the back side of the transparent protective layer, and an optical recording layer laminated so as to cover the track pattern. The optical recording member 71 is embedded in the recess of the card substrate through an adhesive layer. The optical recording member 71 is embedded in a position through which at least one of a center line x in the direction of a longer side of the card and a center line y in the direction of a shorter side of the card passes.

Figure 23A:
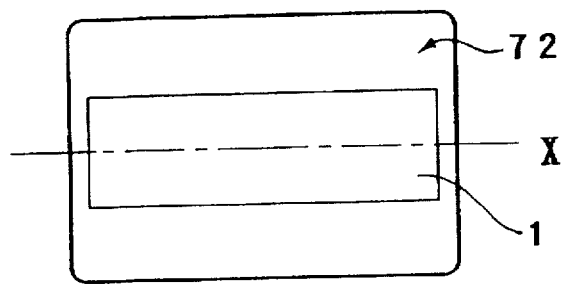
FIGS. 23A and 23B are plan views showing still preferred embodiments of the optical card according to the present invention.
Figure 23B:
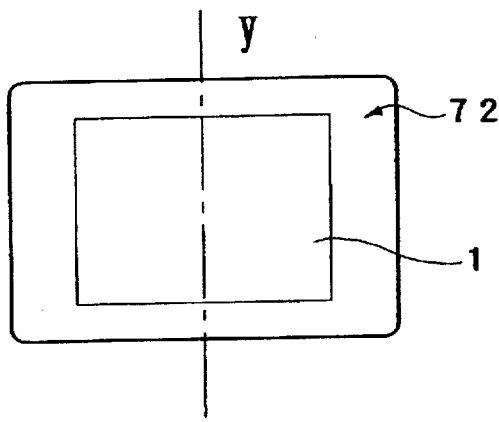
Figure 24:
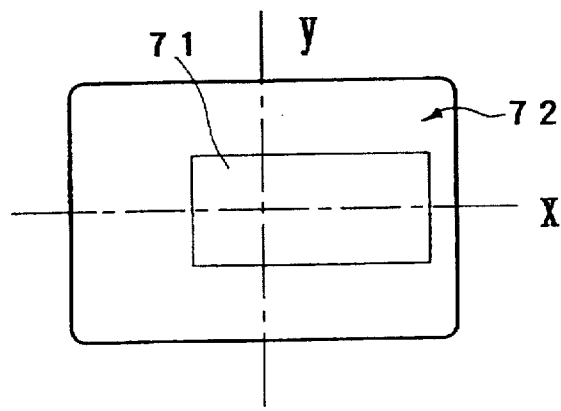
FIG. 24 is a plan view showing a further embodiment of the optical card according to the present invention.

As shown in FIGS. 23A and 23B, a further improvement in bending strength can be attained when the optical recording member 71 is embedded substantially symmetrically with respect to the center line x in the direction of a longer side of the card or the center line y in the direction of a shorter side of the card. Since the bending strength in the direction of a longer side of the card is lower than that in the direction of a shorter side of the card, the bending strength is not significantly influenced by embedding of the optical recording member in a substantially symmetrical manner with respect to the center line y in the direction of a shorter side of the card, as shown in FIG. 24.

Preferably, the optical recording member 71 is embedded in the recess of the card substrate in such a manner that the end face of the optical recording member 71 is not exposed from the surface of the card substrate 72. In this case, the adhesive layer between the optical recording member 71 and the card substrate 72 is preferably provided on the end face as well as the bottom face of the optical recording member 71.

Figure 25:
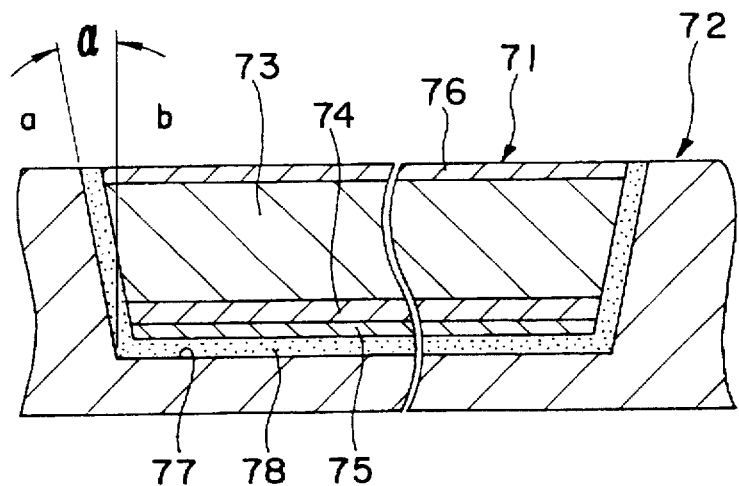
FIG. 25 is a cross-sectional view showing the embedding of an optical recording member in an optical card.

Further, in order to facilitate the fitting of the optical recording member 71 into the recess of the card substrate 72, it is preferred to provide a taper α in the end face a of the optical recording member 71 and the side face b of the recess of the card substrate 72, as shown in FIG. 25 (cross-sectional view). Such taper α is preferably provided in at least each side in the longitudinal direction.

The layer construction of the optical card will now be described with reference to FIG. 25. In the drawing, numeral 73 designates a transparent protective layer having a track pattern 74 on the underside thereof, numeral 75 an optical recording layer laminated so as to cover the track pattern 74, and numeral 76 a surface protective layer provided on the surface of the transparent protective layer 73. These elements constitute the optical recording member 71. The optical recording member 71 is embedded in the recess 77 formed in the card substrate 72 through an adhesive layer 78.

Methods for preparing the above optical recording member 71 and the card substrate 72 can be classified roughly into two methods. The first method is to form the end face a of the optical recording member 71 and the recess 77 of the card substrate 72 by cutting, and the second method is to form the optical recording member 71 and the card substrate 72 by injection or cast molding.

In the first method, a plate having a plurality of optical recording members is first prepared each of which comprises a transparent protective layer 73, a surface hard layer 76 formed on one side of the transparent protective layer 73, and a layer having a track pattern 74 and an optical recording material layer 75 formed on the other side of the transparent protective layer 73 remote from the surface hard layer. This is cut into individual optical recording members 71 having a predetermined size. At that time, if necessary, a desired taper a is provided in the end face a. In the cutting, a protective layer is provided on the surface of the optical recording layer 75 in order to avoid damage to the optical recording material layer 75. The protective layer may be formed of a material having no adverse effect on the optical recording material layer 75, such as an acrylic, vinyl chloride, or polyester material. When a protective film is used, there is no need to provide the protective layer.

It is important for the transparent protective layer 73 to be formed of a material which is less likely to exhibit birefringence. Suitable materials for the transparent protective layer include polycarbonate (PC), polymethyl methacrylate (PMMA), acrylonitrile/styrene copolymer (AS), cellulose propionate (CP), cellulose acetate butyrate (CAB), polyvinyl chloride (PVC), and polyesters. Among them, an about 400 μm-thick polycarbonate (PC) layer is preferred.

The surface hard layer 76 provided on one side of the transparent protective layer 73 is suitably formed of an acrylic UV-curable hard coating agent. Other hard coating agents, such as melamine and silicone hard coating agents, may also be used. Preferably, the hard coating agent has excellent temperature and moisture resistance and hardness high enough to cause no cracking upon bending.

The layer having a track pattern 74 formed on the other side of the transparent protective layer 73 may be generally formed by 2P, injection, casting, or other known methods. When the track pattern 74 is formed by the 2P method, the resin used is a UV-curable resin. On the other hand, when the pattern 74 is formed by the injection or casting method, the resin used is the same as that used in the transparent protective layer 73. The layer having the track pattern 74 is formed closely although a gutter for cutting is provided. This is for effectively using the optical recording material.

The optical recording layer 75 may be formed of a commonly used metallic optical recording material, such as a tellurium- or bismuth-based material. It may also be formed of a dye optical recording material, such as phthalocyanine- or naphthoquinone-based recording material. The optical recording material layer may be of ROM type as well as write-once read-many type.

Separately, a recess 77 in which the optical recording member 71 is to be embedded is formed in the card substrate 72 by cutting (counter sinking). The recess 77 is formed in a position through which at least one of a center line x in the direction of a long side of the card and a center line y in the direction of a short side of the card is passed. In this case, it is preferred for the position of the recess 77 to be symmetrical with respect to the center line x. The position of the recess 77 may be symmetrical with respect to the center line y. In this case, when the optical recording member 71 in its end face a has a taper α, counter sinking is carried out so that the taper of the side face b of the recess corresponds to the taper a of the end face of the optical recording member 71. Further, in order to make the recess 77 parallel to the card edge, cutting of the end face a of the card substrate 72 is carried out simultaneously with the counter sinking.

The card substrate 72 is formed of polyvinyl chloride, ABS resin or the like. In the case of the card substrate formed of polyvinyl chloride, a four-layer structure of 0.10/0.28/0.28/0.10 mm, 0.05/0.37/0.37/0.05 mm or the like is suitable. 0.10 mm-thick polyvinyl chloride and 0.05 mm-thick polyvinyl chloride are transparent. On the other hand, 0.28 mm-thick polyvinyl chloride and 0.37 mm-thick polyvinyl chloride are pearlescent. In order to enhance the abrasion resistance of a print, printing is carried out on one side of the pearlescent polyvinyl chloride.

The optical recording member 71 is fixed into the recess 77 of the card substrate 72 through an adhesive layer 78. Known adhesives, such as urethane, epoxy, acrylic, vinyl, and amide adhesives, may be used for this purpose. Since, however, the adhesive comes into direct contact with the optical recording layer 75, it preferably has high recording sensitivity and excellent temperature and moisture resistance. The fixation with the adhesive is carried out by dropping an UV-curable adhesive in the recess 77 of the card substrate 72, fitting the optical recording member 71 into the recess 77, pressing the optical recording member 71 by means of a flat press having a size equal to that of the optical recording member 71, and applying ultraviolet light to the resultant assembly to adhere the optical recording member 71 to the card substrate 72. Alternatively, it is also possible to use a method which comprises previously applying a hot-melt adhesive to the optical recording member 71 through a T-die, fitting the optical recording member 71 into the recess 77, and hot-pressing the optical recording member by means of a flat press or a roll press. Other methods may also be used. In all the above methods, pressing conditions are set so that the adhesive is spread between the end face a of the optical recording member 71 and the side face b of the recess of the card substrate 72. When a pressure-sensitive adhesive is used for fixing the optical recording member 71 into the recess 77 of the card substrate 72, a pressure-sensitive adhesive double coated tape may be used.

In another embodiment of the first method, an optical recording member 71 comprising a transparent protective layer 73, a surface hard layer 76 provided on one side of the transparent protective layer 73, and a layer having a track pattern 74 and an optical recording layer 75 provided on the other side of the transparent protective layer 73 is prepared, and a plastic hot-melt adhesive is coated onto the optical recording layer 75. A plate having a plurality of optical recording members 71 with an adhesive layer laminated thereon is cut into individual optical recording members 71 which are then subjected to cutting in the same manner as described above. Then, the optical recording member 71 is fitted into the recess 77 of the card substrate 72, and bonding is carried out by hot pressing by taking advantage of heat from a flat press or a roll press. In this case, pressing conditions are set so that the adhesive is melted and spread between the end face a of the optical recording member 71 and the side face b of the recess of the card substrate 72.

In the second method, a transparent protective layer 73 having a track pattern is prepared using polycarbonate, acrylic, or other resins by injection or cast molding commonly known in the art. In this case, if necessary, the end face a of the transparent protective layer 73 is tapered. Then, a surface hard layer 76 is formed on the side of the transparent protective layer remote from the track pattern, and an optical recording layer 75 is formed on the track pattern face. The surface hard layer 76 and the optical recording layer 75 may be the same as those described above. Separately, a card substrate 72 is prepared using ABS resin, polyvinyl chloride, or other resins by injection or casting. At that time, a recess 77 in which the optical recording member 71 is to be embedded is formed. In this case, when the optical recording member 71 has a taper α in the end face a, a taper corresponding to the taper α in the end face of the optical recording member 71 is provided in the side face b of the recess. The recess 77 of the card substrate 72 is formed in a position through which at least one of a center line x in the direction of a longer side of the card and a center line y in the direction of a shorter side of the card is passed. In this case, it is preferred for the position of the recess 77 to be symmetrical with respect to the center line x. The position of the recess 77 may be symmetrical with respect to the center line y. A design is provided by in-mold decorating. The optical recording member 71 is fixed into the recess 77 of the card substrate 72 by means of an adhesive or a pressure-sensitive adhesive in the same manner as described above.

Figure 26:
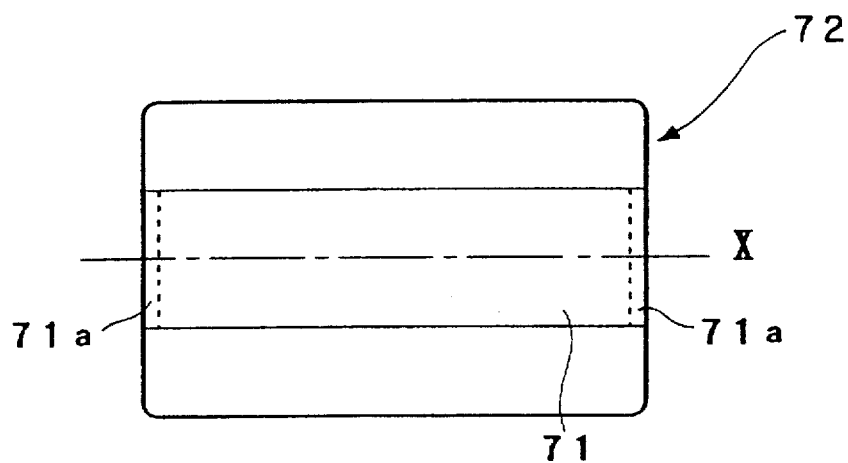
FIG. 26 is a plan view illustrating a further embodiment of the optical card.

In the optical cards of the type shown in FIGS. 22 to 24, the optical recording member 71 is embedded in an island form in the card substrate. It is also possible to use a method wherein, as shown in FIG. 26, the optical recording member 71 is embedded in the card substrate 72 with both ends thereof having a trimmed-off structure. If embedding in this way is adopted, the recess 77 can be formed in the card substrate 72 by one-pass counter sinking even when the width of the recess 77 is large, enabling the cost to be lowered. It is noted that when $TeO_x$ or the like is used in the optical recording layer 75, there is a possibility that oxidation starts at both edges of the optical recording member. For this reason, no optical recording material layer 75 is preferably provided in the optical recording member 71 in its portions near respective both ends 71a. This offers an additional advantage that the appearance of the resultant card is like that of the card with the optical recording member embedded in an island form.

Figure 27:
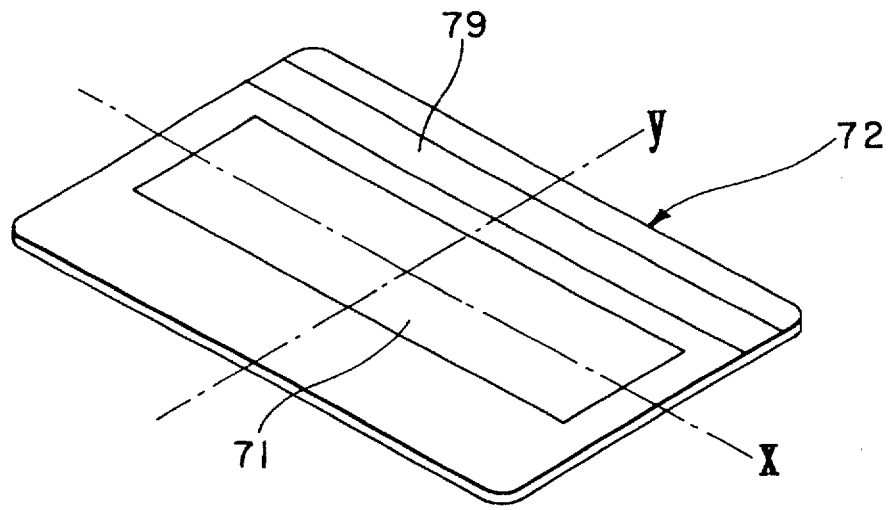
FIG. 27 is a perspective view showing one embodiment of the optical card provided with a magnetic stripe on the same side of the card as that where an optical recording member is provided.
Figure 28:
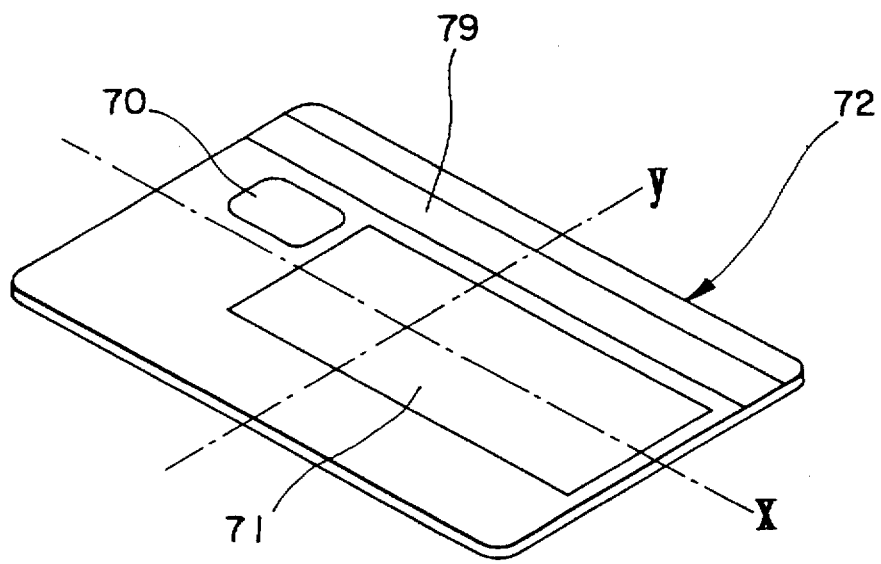
FIG. 28 is a perspective view showing one embodiment of the optical card provided with a magnetic stripe and an IC module on the same side as that where an optical recording member is provided.

In the optical card of the present invention, in order to diversify the use of the card, as shown in FIGS. 27 and 28, a magnetic stripe 79 may be provided on one side of the card substrate 72, which is the same as or opposite to the side where the optical recording member 71 is provided, or both sides of the card substrate 72, and an IC module 70 may be provided on one side of the card substrate 72 which is the same as or opposite to the side where the optical recording member 71 is provided. Further, it is a matter of course that characters representing information on the cards, such as personal name and registration number, can be formed as a relief of characters by embossing in the area other than that where the optical recording member is present.

According to the optical card of the present invention having the above construction, the optical recording member and the recess of the card substrate in which the optical recording member is embedded are located in a position through which at least one of a center line in the direction of a longer side of the card and a center line in the direction of a shorter side of the card is passed, preventing stress created in the recess upon bending of the card from being remarkably localized. In particular, when the optical recording member is embedded so that it is substantially symmetrical with respect to the center line in the longitudinal direction of the card, the stress created upon bending of the card can be evenly dispersed.

Fifth Aspect of Invention

The optical card of the present invention according to the fifth aspect of the present invention comprises a card substrate, and an optical recording member, having a rectangular shape in flat, comprising a transparent protective layer, a track pattern provided on the back side of the transparent protective layer, and an optical recording layer laminated so as to cover the track pattern. The optical recording member is embedded in the card substrate with the surface of the optical recording member exposed from the card substrate. The transparent protective layer is provided with a rib portion at least on both sides thereof in the longitudinal direction of the optical recording layer with the rib portions being dropped in level from the top surface of a protrusion constituting the transparent protective layer except for the rib portions. The optical recording member is embedded and adhesive-fixed in the card substrate so that a part of the card substrate covers the rib portions and the surface of the protrusion excluding the rib portions is exposed from the card substrate. The optical card having the above construction can be produced by any of the following three processes.

The first production process comprises the steps of: preparing a back sheet and a top sheet for constituting the card substrate; forming, in the back sheet, a recess in which the rib portions and a portion in a lower position than the rib portions of the optical recording member are to be embedded and forming, in the top sheet having the same thickness as the protrusion of the optical recording member, an opening having a size corresponding to the protrusion; and adhesive-fixing or fitting the optical recording member into the recess of the back sheet, putting the top sheet on top of the back sheet so as for the protrusion of the optical recording member to be fitted into the opening, and joining and integrating the back sheet with the top sheet by bonding.

The second production process comprises the steps of: preparing a back sheet, an intermediate sheet, and a top sheet for constituting the card substrate; forming, in the intermediate sheet having the same thickness as the rib portions of the optical recording member, an opening having a size suitable for fitting the rib portions thereinto and forming, in the top sheet having the same thickness as the protrusion of the optical recording member, an opening having a size corresponding to the protrusion; putting the back sheet and the intermediate sheet on top of the other and fitting the optical recording member into a recess defined by the opening of the intermediate sheet; and putting the top sheet on top of the intermediate sheet so as for the protrusion of the optical recording member to be fitted into the opening of the top sheet and joining and integrating the elements with one another by bonding.

The third production process comprises the steps of: preparing a back sheet and a top sheet for constituting the card substrate; forming, in the top sheet having the same thickness as the optical recording member, a stepped opening into which the optical recording member is to be fitted from the back side of the top sheet; adhesive-fixing the optical recording member into the opening; and laminating the back sheet onto the back side of the top sheet.

According to the optical card having the above construction, the rib portions of the optical recording member is pressed by the top sheet, preventing the optical recording member from emerging from the card substrate upon bending of the card and enabling the stress created by bending of the card to be relaxed. Therefore, there is no fear of the card substrate being folded.

The present invention will now be described in more detail with reference to the accompanying drawings.

Figure 29:
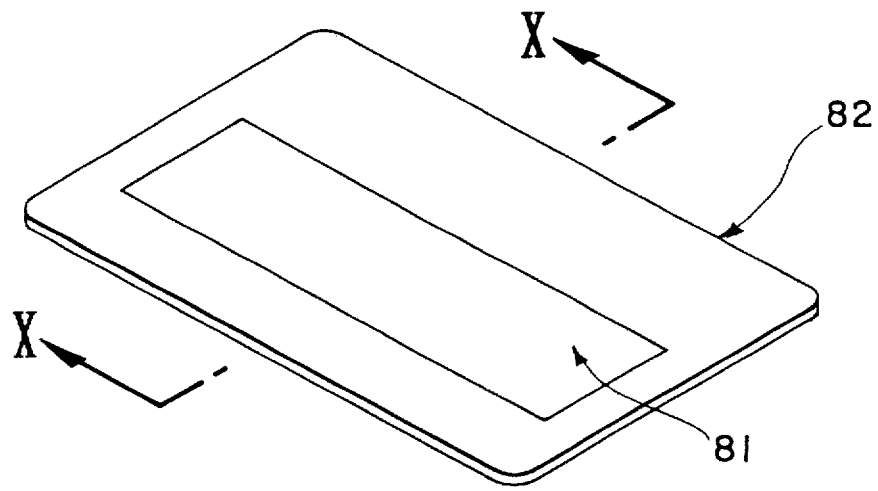
FIG. 29 is a perspective view showing a further embodiment of the optical card according to the present invention.
Figure 30:
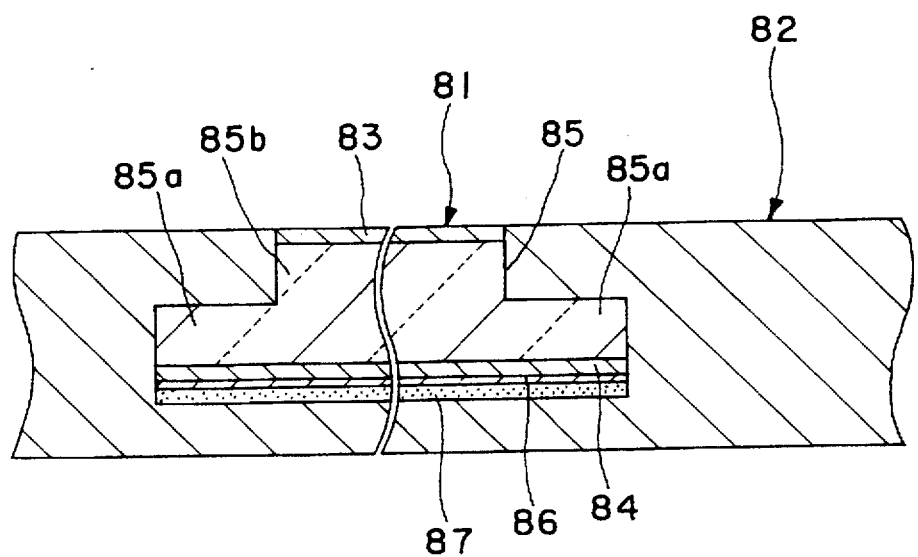
FIG. 30 is a schematic view taken on line X—X of FIG. 29.

FIG. 29 is a perspective view showing one embodiment of the present invention, and FIG. 30 is a schematic cross-sectional view taken on line X—X of FIG. 29.

In the optical card shown in FIG. 29, an optical recording member 81, having a rectangular shape in flat, is embedded in a card substrate 82 with the surface of the optical recording member exposed from the card substrate. As shown in FIG. 30, the optical recording member 81 comprises a transparent protective layer 85, a surface hard layer 83 formed on the upper surface of the transparent protective layer 85, a track pattern 84 formed on the lower surface of the transparent protective layer 85, and an optical recording layer 86 laminated so as to cover the track pattern 84. The transparent protective layer 85 is provided with a rib portion 85a on both sides thereof in the longitudinal direction of the optical recording layer with the rib portions being dropped in level from the top surface of a protrusion constituting the transparent protective layer. The optical recording member 81 is embedded in the card substrate 82 so that a part of the card substrate 82 covers the rib portions 85 and the surface of the protrusion 85b excluding the rib portions 85a is exposed from the card substrate 82. The optical recording member 81 is adhesive-fixed in the card substrate 82 through an adhesive layer 87. The surface of the protrusion 85b is preferably flush with the surface of the card substrate 82. However, some projection or recession is acceptable.

The optical recording member 81 having the above construction is prepared as follows. At the outset, an optical recording member is prepared which comprises a transparent protective layer 85, a surface hard layer 83 formed on one side of the transparent protective layer 85, and a pattern layer of a track pattern 84 and an optical recording layer 86 on the other side of the transparent protective layer 85 remote from the surface hard layer 83. The end face of the optical recording member is cut into a desired shape having a difference in level. In the cutting, a protective layer is provided on the surface of the optical recording layer 86 in order to avoid damage to the optical recording layer 86. The protective layer may be formed of a material having no adverse effect on the optical recording layer 75, such as an acrylic, vinyl chloride, or polyester material. When a protective film is used, there is no need to provide the protective layer.

It is important for the transparent protective layer 85 to be formed of a material which is less likely to exhibit birefringence. Suitable materials for the transparent protective layer include polycarbonate (PC), polymethyl methacrylate (PMMA), acrylonitrile/styrene copolymer (AS), cellulose propionate (CP), cellulose acetate butyrate (CAB), polyvinyl chloride (PVC), and polyesters. Among them, an about 400 µm-thick polycarbonate (PC) layer is preferred.

The pattern layer formed on the other side of the transparent protective layer 85 may be generally formed by 2P method, injection, casting, or other known methods. When the track pattern is formed by the 2P method, the resin used is a UV-curable resin. On the other hand, when the track pattern is formed by the injection or casting method, the resin used is the same as that used in the transparent protective layer 85. The pattern layer is formed closely although a gutter for cutting is provided. This is for effectively using the optical recording material.

The optical recording layer 86 may be formed of a commonly used metallic optical recording material, such as a tellurium- or bismuth-based material. It may also be formed of a dye optical recording material, such as phthalocyanine- or naphthoquinone-based recording material. The optical recording material layer may be of ROM type as well as write-once read-many type.

The optical recording member 81 having the above construction can be prepared also by the following method. A transparent protective layer 85 having a track pattern 84 is prepared using polycarbonate, acrylic, or other resins by injection or casting commonly known in the art. The end face of the transparent protective layer 85 is cut into a desired shape having a difference in level. Subsequently, a surface hard layer 83 is formed on the side of the transparent protective layer 85 remote from the track pattern 84, and an optical recording layer 86 is formed on the track pattern face 84. The surface hard layer 83 and the optical recording layer 86 may be the same as those described above.

Methods for producing an optical card, shown in FIGS. 29 and 30, by embedding the optical recording member 81 prepared above in the card substrate 82 can be classified roughly into three methods. These methods will now be described with reference to FIGS. 31 to 33. In these drawings, the surface protective layer 83 and the track pattern 84 in the optical recording member 81 are not shown.

Figure 31A:
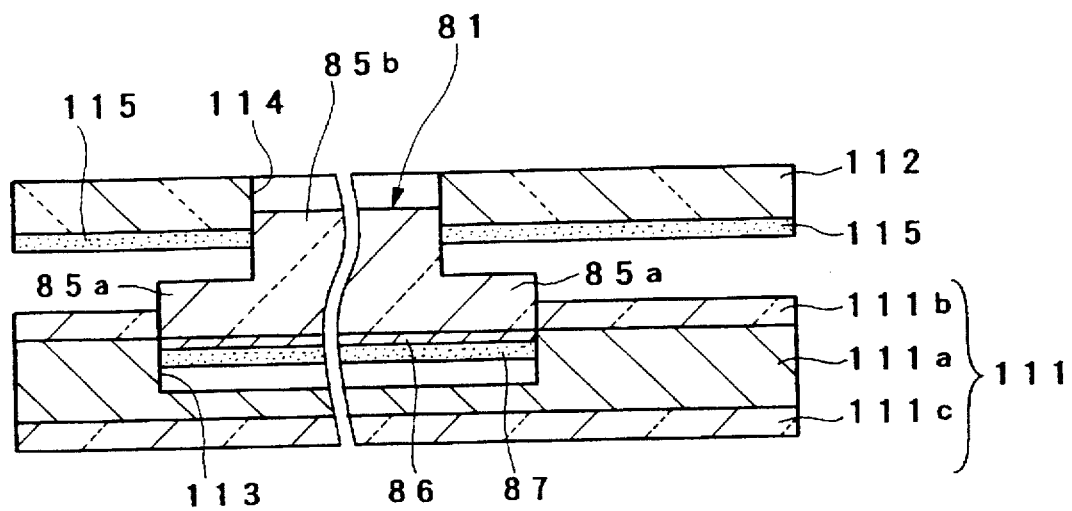
FIGS. 31A and 31B are diagrams showing an embodiment of the process for producing an optical card according to the present invention.

In the first production method, as shown in FIG. 31A, a card substrate 82 is formed of a back sheet 111 and a top sheet 112. The back sheet 111 has a three-layer structure comprising a core sheet 111a formed of pearlescent polyvinyl chloride and, laminated on both sides of the core sheet 111a, an overlay sheet 111b formed of transparent polyvinyl chloride. A design or the like is printed on both sides of the core sheet 111a. On the other hand, a transparent polyvinyl chloride sheet having the same thickness as the protrusion 85b of the optical recording member 81 is used for the top sheet 112. A recess 113 in which the rib portions 85a and a portion located under the rib portions 85a are to be embedded is formed on the back sheet 111. In addition, an opening 114 having a size corresponding to the size of protrusion 81b is formed in the top sheet 112. Thus, the back sheet 111 and the top sheet 112 are worked. The optical recording member 81 is first fixed into the recess 113 of the back sheet 111 through an adhesive layer 87.

Known adhesives, such as urethane, epoxy, acrylic, vinyl, and amide adhesives, may be used in the adhesive layer 87. Since, however, the adhesive layer 87 comes into direct contact with the optical recording layer 86, it preferably has high recording sensitivity and excellent temperature and moisture resistance. The fixation with the adhesive is carried out by dropping an UV-curable adhesive in the recess 113, fitting the optical recording member 81 into the recess 113, pressing the optical recording member 81 by means of a flat press having a size equal to that of the optical recording member 81, and applying ultraviolet light to the resultant assembly. Alternatively, it is also possible to use a method which comprises previously applying a hot-melt adhesive to the optical recording member 81 through a T-die, fitting the optical recording member 81 into the recess, and hot-pressing the optical recording member by means of a flat press or a roll press. Other methods may also be used. Bonding may also be carried out with a pressure-sensitive adhesive double coated tape. Further, the following method may also be used. Subsequently to the formation of the track pattern and the optical recording layer 86 on one side of the transparent protective layer 85, a plastic hot-melt adhesive is coated onto the optical recording layer 86. The optical recording member with an adhesive layer 87 laminated thereon is then cut into a desired shape. The optical recording member 81 is fitted into the recess 113 of the back sheet 111, and bonding is carried out by hot pressing using a flat press or a roll press.

Then, the transparent top sheet 112 is adhered onto the top surface of the back sheet 111 so that the protrusion 81b is fit into the opening 115 of the top sheet 112. In this case, it is possible to use a method which comprises coating a hot-melt adhesive on the back side of the top sheet 112 to form an adhesive layer 115, putting the top sheet on top of the back sheet 111 and then hot-pressing the resultant assembly by means of a flat press or a roll press to carry out bonding. Since the adhesive layer 115 is not associated with the optical recording layer 86, it is possible to use an adhesive having high adhesive strength.

Figure 31B:
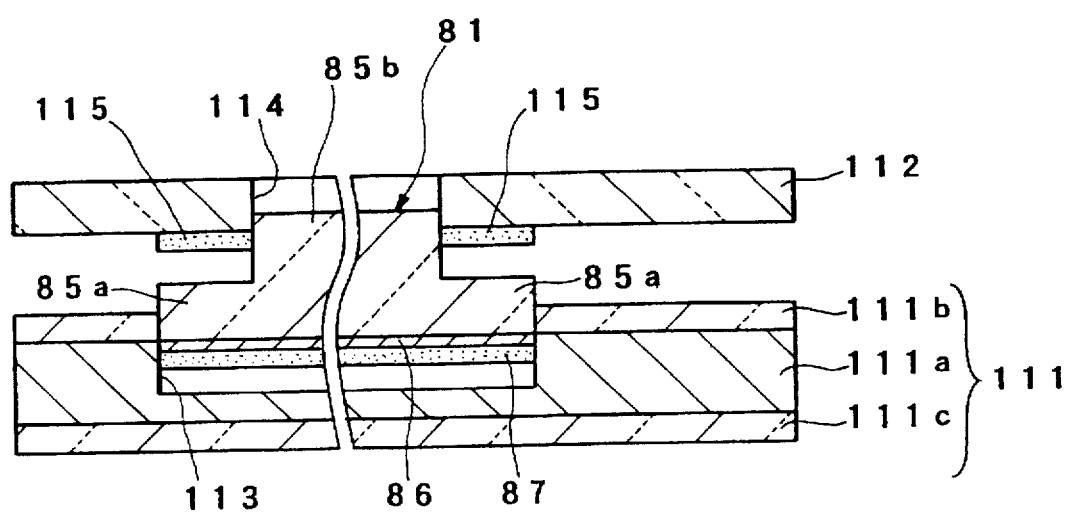

When the top sheet 112 is formed of transparent vinyl chloride, a method may be used wherein, as shown in FIG. 31B, an adhesive layer 115 on the back side of the top sheet 112 is provided in only portions corresponding to the rib portions 85a and, in the other portions, lamination is carried out by heat fusing. In all the above methods, the fixation of the optical recording member 81 into the recess 113 by bonding may be carried out simultaneously with the lamination of the top sheet 112 onto the back sheet 111.

Figure 32A:
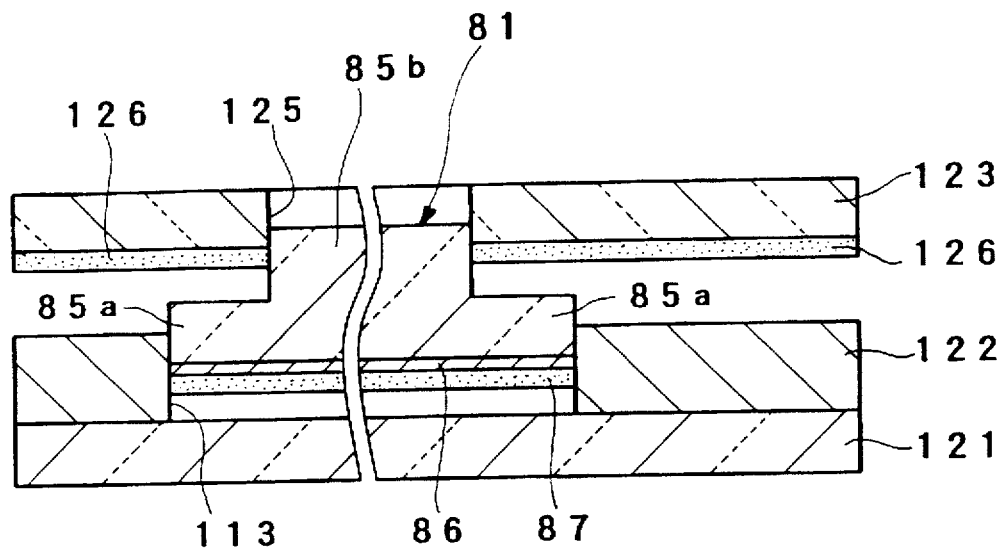
FIGS. 32A and 32B are diagrams showing another embodiment of the process for producing an optical card according to the present invention.

In the second production method, as shown in FIG. 32A, a card substrate 82 is formed of a back sheet 121, an intermediate sheet 122, and a top sheet 123. A transparent polyvinyl chloride sheet having a predetermined thickness is used as the back sheet 121, a pearlescent polyvinyl chloride sheet having the same thickness as the rib portions 85a of the optical recording member 81 is used as the intermediate sheet 122, and a transparent polyvinyl chloride sheet having the same thickness as the protrusion 85b of the optical recording member 81 is used as the top sheet 123. A design or the like is printed on both sides of the intermediate sheet 122. An opening 124 having a size suitable for fitting the rib portions 85a of the optical recording member 81 is formed in the intermediate sheet 122, and an opening 125 having a size corresponding to the size of the protrusion 85b of the optical recording member 81 is formed in the top sheet 123. Further, an adhesive layer 126 is provided on the back side of the top sheet 123, for example, by coating a hot-melt adhesive.

Thus, the intermediate sheet 122 and the top sheet 123 are worked. The intermediate sheet 122 is first put on top of the back sheet 121 and temporarily fixed thereto. Then, the optical recording member 81 is fitted and temporarily fixed into the recess defined by the opening 124. Thereafter, the top sheet 123 is put on top of the intermediate sheet 122 so that the protrusion 85b of the optical recording member 81 is fitted into the opening 125. The whole assembly is then hot-pressed. By the hot pressing, the back sheet 121 is bonded to the intermediate sheet 122 by heat fusing, and the optical recording member 81 is bonded and fixed to the card substrate 82 through the adhesive layer 87 and the adhesive layer 126. Since the adhesive layer 126 is not associated with the optical recording layer 86, it is possible to use an adhesive having high adhesive strength.

Figure 32B:
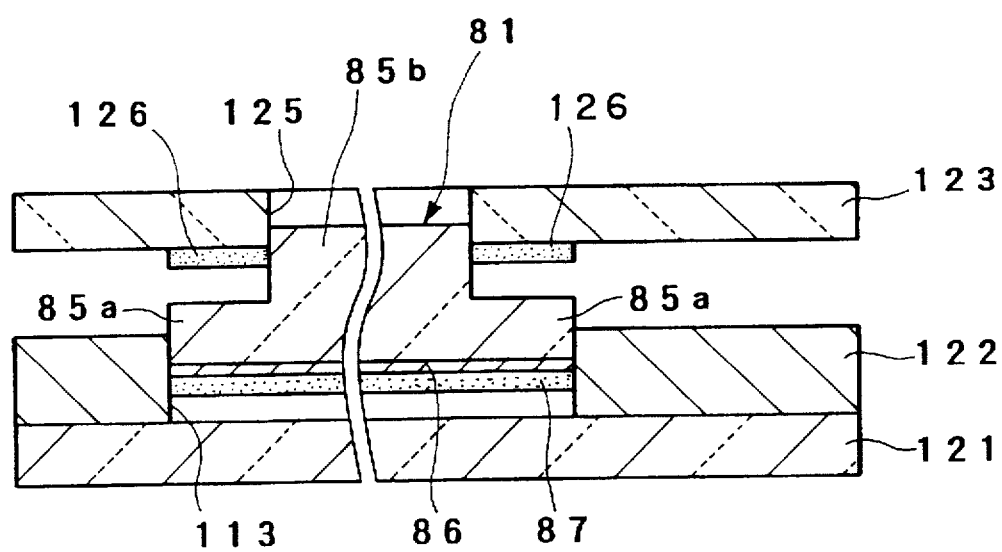

Further, a method may also be used wherein, as shown in FIG. 32B, an adhesive layer 126 on the back side of the top sheet 123 is provided in only portions corresponding to the rib portions 85a and, in the other portions, lamination is carried out by heat fusing. Furthermore, it is also possible to use a method wherein a sheet having a three-layer structure, like the back sheet 111 described above in connection with the first production method, is used as the back sheet 121, a similar design is printed thereon, and a transparent sheet is used as the intermediate sheet 122 and the back sheet 123.

Figure 33A:
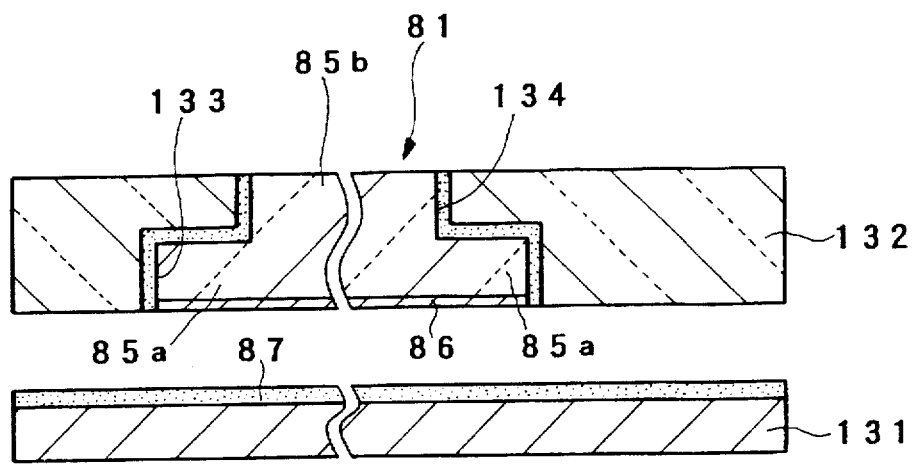
FIGS. 33A and 33B are diagrams showing a further embodiment of the process for producing an optical card according to the present invention.

In the third production method, as shown in FIG. 33A, a card substrate 82 comprises a back sheet 131 and a top sheet 132. In one embodiment, a pearlescent polyvinyl chloride sheet having a predetermined thickness is used as the back sheet 131, a transparent polyvinyl chloride sheet having the same thickness as the optical recording member 81 is used as the back sheet 132, and a design or the like is previously printed on the inner side of the back sheet 131. In another embodiment, a pearlescent polyvinyl chloride sheet is used as the top sheet 132, a transparent polyvinyl chloride sheet is used as the back sheet 131, and a design or the like is printed on the inner side of the top sheet 132. A stepped opening 133 into which the optical recording member 81 is to be fitted from the back side of the top sheet 132 is formed in the top sheet 132. The optical recording member 81 is adhesive-fixed into the opening 133 through an adhesive layer 134. Then, the back sheet 131 is laminated onto the back side of the top sheet 132 through an adhesive layer 87. In this case, the optical recording member 81 too is adhesive-fixed to the back sheet 131 through the adhesive layer 87.

Figure 33B:
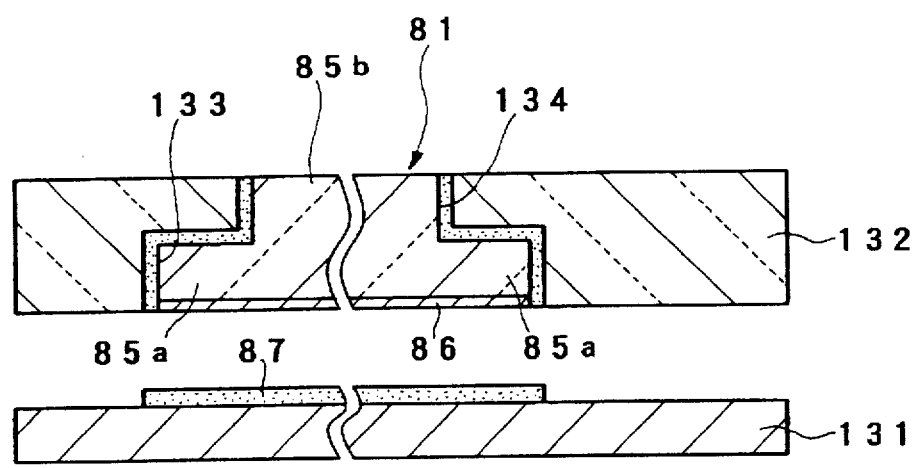

A method may also be used wherein, as shown in FIG. 33B, an adhesive layer 87 on the inner side of the back sheet 83 is provided in only portions corresponding to the optical recording layer 86 and, in the other portions, lamination is carried out by heat fusing.

Figures 34A, 34B:
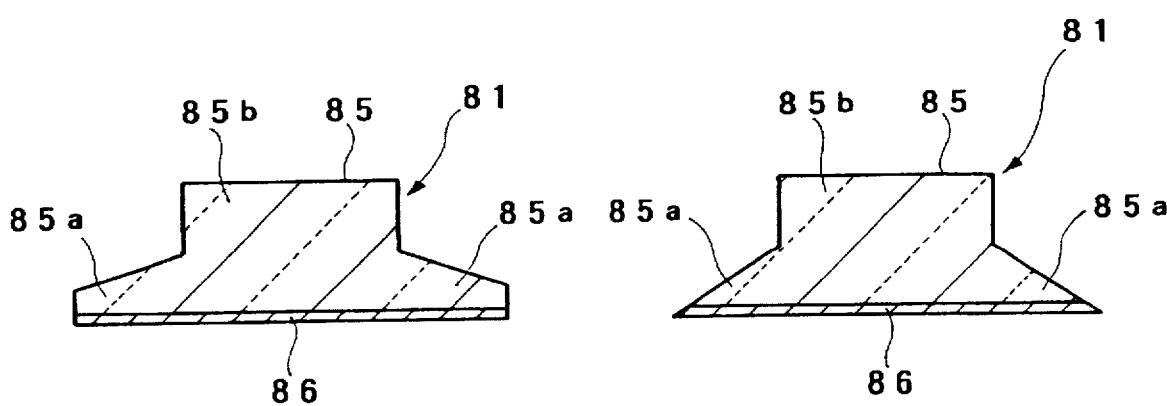
FIGS. 34A and 34B are cross-sectional views showing further embodiments of the form of the optical recording member.

As shown in FIGS. 34A and 34B, the rib portions 85a formed in the transparent protective layer 85 of the optical recording member 81 may be inclined. What is required of the rib portions which have been embedded in the card substrate is to prevent the optical recording member from emerging from the card substrate upon bending of the card. The form of the recess formed in the card substrate 82 preferably conforms to that of the optical recording member 81. Some gap between the optical recording member and the card substrate poses little or no problem because such gap is filled with the adhesive. Further, a gap may be provided between the optical recording member 81 in its portion other than the bottom face and the card substrate 82. This gap serves as a reservoir for the adhesive at the time of bonding of the optical recording member 81. The presence of the adhesive on the side face as well as on the bottom face of the optical recording member 81 results in further improved bending strength.

Figure 35:
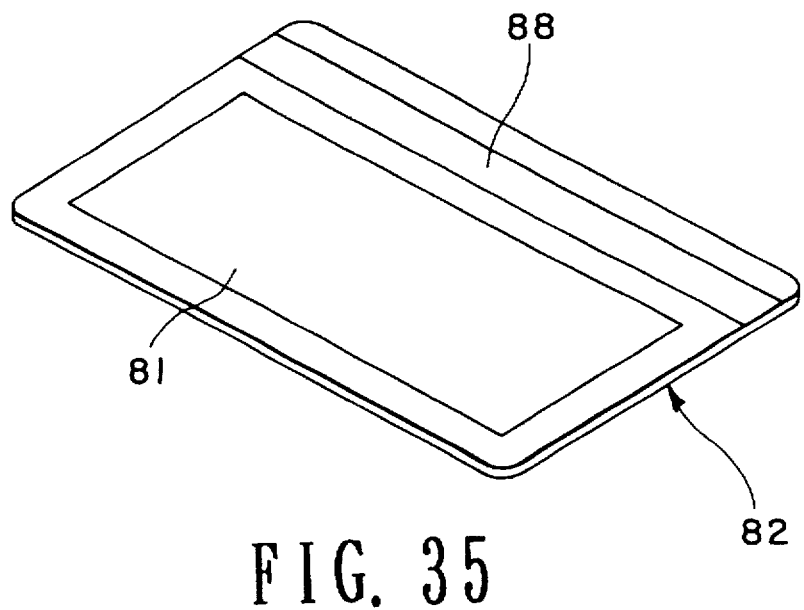
FIG. 35 is a perspective view of a further embodiment of the optical card provided with a magnetic stripe on the same side of the card as that where an optical recording member is provided.
Figure 36:
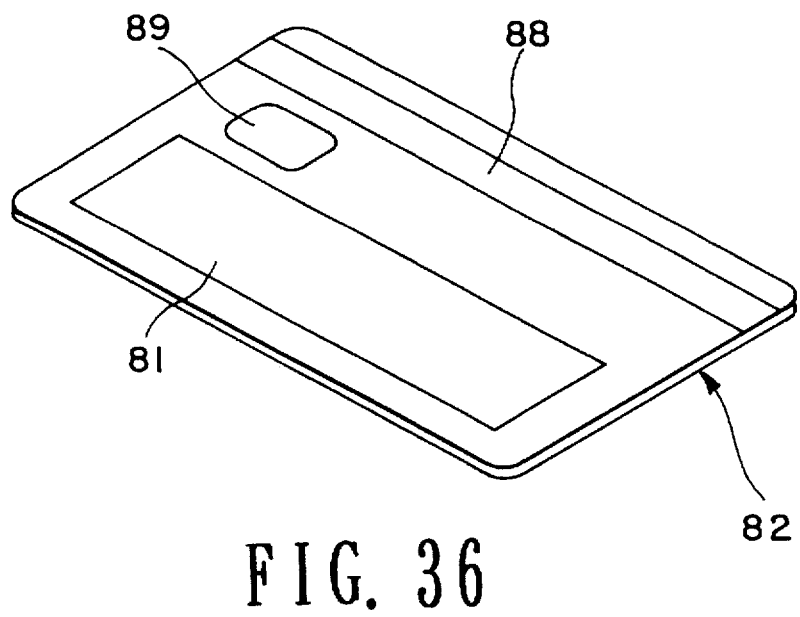
FIG. 36 is a perspective view of a further embodiment of the optical card provided with a magnetic stripe and an IC module on the same side of the card as that where an optical recording member is provided.

In order to diversify the use of the card, as shown in FIGS. 35 and 36, a magnetic stripe 88 may be provided on one side of the card substrate 82, which is the same as or opposite to the side where the optical recording member 81 is provided, or both sides of the card substrate 82, and an IC module 89 may be provided on one side of the card substrate 82 which is the same as or opposite to the side where the optical recording member 81 is provided. Embossing may be carried out in an area other than the area where the above elements are provided.

In the present invention, when the presence of the rib portions is recognized from the outside of the card to deteriorate the appearance of the card, this problem can be eliminated by the following methods.

(i) For example, in embodiments shown in FIGS. 31A and 32A, when the surface sheet 112 (123) is transparent, particular printing (including the formation of a print layer by transfer) may be conducted on the top side or back side of this sheet so that the presence of the rib portions is not recognized from the outside of the card.

(ii) No optical recording member is formed in portions corresponding to the rib portions (not shown) so that the presence of the rib portions is not substantially recognized from the outside of the card.

As described above, according to the optical card of the present invention, the transparent protective layer of the optical recording member is provided with a rib portion on both sides thereof in the longitudinal direction, the optical recording member is embedded and fixed by bonding in the card substrate so that a part of the card substrate covers the rib portions and the surface of the protrusion excluding the rib portions is exposed from the card substrate. By virtue of this constitution, the rib portions of the optical recording member are pressed, preventing the optical recording member from emerging from the card substrate upon bending of the card. Thus, the optical card of the present invention has high bending strength.

Since the optical recording member is embedded in a part of the card substrate, the utilization of the remaining area of the card substrate enables the preparation of optical cards in such a form that could not prepared in the prior art, for example, an optical card having a magnetic stripe on both sides thereof, an optical card having an emboss, and an optical card wherein an optical recording member and an IC module are provided on different sides of the card.

EXAMPLE A1

A hard coat agent (UH-001, manufactured by Toray Industries, Inc.) was spin-coated on one side of a 0.4 mm-thick polycarbonate sheet (a transparent protective layer) to form a surface hard layer. Then, a guide track pattern was formed by 2P method (photo polymer method) on the other side of the sheet remote from surface hard layer. TeO$_x$ was sputtered thereon to form an optical recording material layer. Subsequently, an adhesive (PPET-2101, manufactured by Toa Gosei Chemical Industry Co.) was coated using a T-die on the optical recording material layer to form a 50 μm-thick adhesive layer. Then, cutting was carried out in such a manner that the whole end face was tapered at an angle of 10° and parallel to the card track, thereby preparing an optical recording member.

Silk offset printing was carried out on each one side of two 0.28 mm-thick pearlescent polyvinyl chloride sheets. The two core sheets were put on top of the other so that the non-printed faces faced each other. In this state, the two core sheets were sandwiched between two 0.10 mm-thick overlay sheets, and heat fusing was carried out to prepare a card substrate having a four-layer structure. A magnetic tape of 650 oersted was formed on one side of one of the overlay sheets, while a magnetic tape of 290 oersted was formed on one side of the other overlay sheet. A recess, having a rectangular shape in flat, in which the optical recording member is to be embedded was formed in the card substrate by cutting. In this case, counter sinking was carried out so that the side face of the recess was tapered at an angle of 10° and the size of the recess was slightly larger than the optical recording member. Further, cutting of the end face of the card substrate was carried out in order to ensure parallelism between the recess and the end face of the card substrate.

The optical recording member was fitted into the recess of the card substrate, and hot pressing was carried out using a flat press having a size equal to the size of the optical recording member under conditions of 120° C. and 6 kg/cm$^2$ for 2.5 sec. This melted the adhesive, and the melt could cover the bottom face and end face of the optical recording member to adhesive-fix the optical recording member into the recess. Further, since heat was transferred from the top of the transparent protective layer (polycarbonate) toward the polyvinyl chloride located at the bottom face of the optical recording member, sagging of the polyvinyl chloride derived from heat was not observed.

The above sample was used to write data of 100 tracks by optical card R/W (3B3H-DJ-01, manufactured by Omron Corp.). As a result, the error rate was within $1\times 10^{-4}$. Further, even after embossing on the card substrate of the above sample, writing and reading by optical card R/W could be successfully carried out. Furthermore, the above sample was tested for bending according to bending test specifications of ISO. As a result, no problem occurred.

EXAMPLE A2

A 0.4 mm-thick patterned polymethyl methacrylate (a surface protective layer) was prepared by casting. In this case, the casting was designed so that the whole end face was tapered at an angle of 10°. Then, a hard coat agent (UH-001, manufactured by Toray Industries, Inc.) was spin-coated on the side of the surface protective layer remote from the pattern face to form a surface hard layer. TeO$_x$ was sputtered on the pattern face to form an optical recording material layer, thereby preparing an optical recording member.

Separately, a card substrate in the form of a 0.78 mm-thick card having in a part thereof a recess having a depth of 0.45 mm and an outer diameter of 16 mm×84 mm, the side face of the recess being tapered at an angle of 10°, was prepared using ABS resin by injection molding. In this case, a design was formed by in-mold decorating.

A UV-curable adhesive (863, manufactured by Kyoritsu Chemical Industry Corporation) was dropped in the recess of the card substrate, and the optical recording member was fitted into the recess. The whole assembly was pressed by a flat press and irradiated with ultraviolet light to cure an adhesive. At that time, press conditions were set so that the adhesive was spread also on the end face of the optical recording member.

The above sample was used to write data of 100 tracks by optical card R/W (3B3H-DJ-01, manufactured by Omron Corp.). The error rate was within $1\times 10^{4}$. Further, the above sample was tested for bending according to bending test specifications of ISO. As a result, no problem occurred.

The present invention having the above constitution has the following effects.

The end face of the optical recording member and the side face of the recess of the card substrate are tapered outwardly so that the taper in the face of the optical recording member faces the taper in the side face of the recess of the card substrate. Further, the optical recording member is embedded in the recess of the card substrate so as for the end face of the optical recording member not to be exposed from the card substrate. This permits the optical recording member to be easily embedded into the recess and can minimize the gap between the end face of the optical recording member and the side face of the recess, offering good appearance.

Since the adhesive layer between the optical recording member and the card substrate is provided on the end face as well as on the bottom face, the optical card has improved bending strength.

Since the optical recording member is embedded in a part of the card substrate, the utilization of the remaining area of the card substrate enables the preparation of optical cards in such a form that could not prepared in the prior art, for example, an optical card having a magnetic stripe on both sides thereof, an optical card having an emboss, an optical card wherein an optical recording member and an IC module are provided on different sides of the card, an optical card both sides of which can be subjected to CP working, and an optical card wherein a hologram can be transferred onto both sides thereof.

EXAMPLE B

Figure 5:
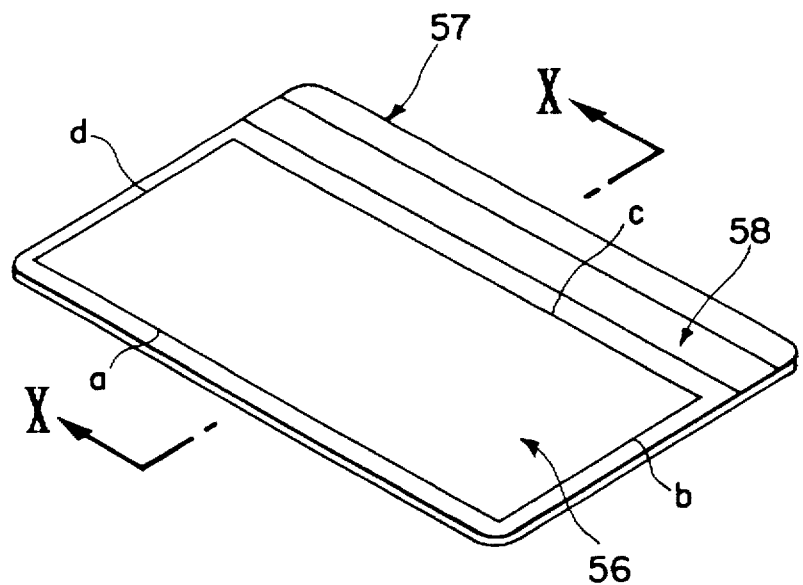
FIG. 5 is a perspective view of an embodiment of the optical card according to the present invention.
Figure 6:
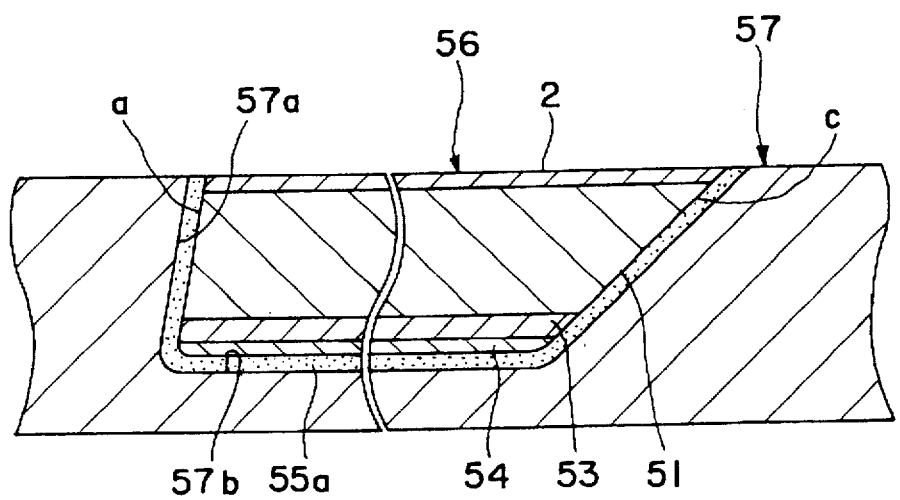
FIG. 6 is a partly enlarged view taken on line X—X of FIG. 5.

FIG. 5 is a perspective view of the first embodiment of the optical card according to the present invention, and FIG. 6 is a partially enlarged view taken on line X—X of FIG. 4. The optical card shown in the drawings was prepared according to the following procedure.

Figure 7:
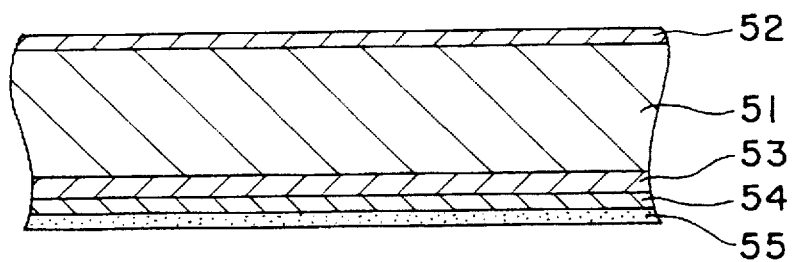
FIG. 7 is a cross-sectional view illustrating a process for producing the optical recording member shown in FIG. 6.
Figure 8:
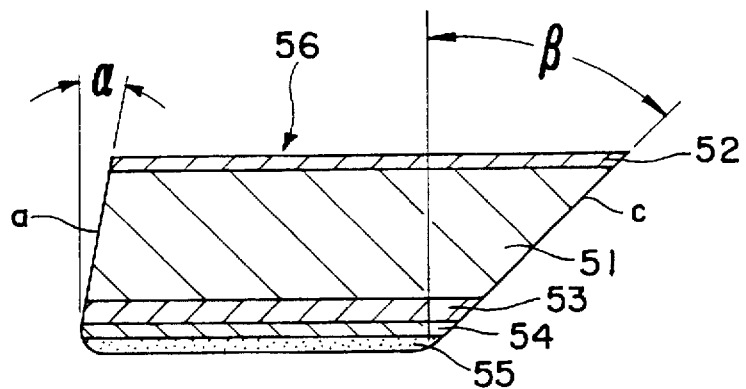
FIG. 8 is a cross-sectional view of the optical recording member shown in FIG. 6.

At the outset, as shown in FIG. 7, a hard coat agent (UH-001, manufactured by Toray Industries, Inc.) was spin-coated on one side of a 0.4 mm-thick polycarbonate sheet (a transparent protective layer 51) to form a surface hard layer 52. Then, a guide track pattern layer 53 was formed by 2P on the other side of the sheet remote from surface hard layer 52. TeO$_x$ was sputtered thereon to form an optical recording material layer 54. Subsequently, an adhesive 55 (PPET-2101, manufactured by Toa Gosei Chemical Industry Co.) was coated using a T-die on the optical recording material layer 54 to form a 50 μm-thick adhesive layer as shown in FIG. 8. Then, the laminate was cut in such a manner that one side a (lower side) in the longitudinal direction was tapered outwardly at an angle α of −10° to the direction normal to the bottom face of the optical recording layer with the other three sides b, c and d, being tapered outwardly at an angle β of 45°, the boundary between each of the side faces and the bottom face was rounded at a radius of curvature of 5 mm and the end face was parallel to the track, thereby preparing an optical recording member 56 having a rectangular shape in flat and an outer dimension of 35 mm×84 mm.

Separately, silk offset printing was carried out on each one side of two 0.28 mm-thick core sheets of pearlescent polyvinyl chloride. The two core sheets were put on top of the other so that the non-printed faces faced each other. In this state, the two core sheets were sandwiched between two 0.10 mm-thick overlay sheets, and heat fusing was carried out to prepare a card substrate 57 having a four-layer structure. A magnetic tape 58 of 650 oersted was formed on one side (top side) of one of the overlay sheets, while a magnetic tape (not shown) of 290 oersted was formed on one side (back side) of the other overlay sheet. A recess 57a, having a rectangular shape in flat, in which the optical recording member 56 is to be embedded was formed in the card substrate 57 by cutting. In this case, counter sinking was carried out in such a manner that one side (lower side) in the longitudinal direction of the side face of the recess 57a was tapered outwardly at an angle of −10° to the direction normal to the bottom face of the recess with the other three sides being tapered outwardly at an angle of 45°, the boundary between the side face 57a and the bottom face 57b of the recess was rounded at a radius of curvature of 5 mm and the size of the recess was slightly larger than the optical recording member 56 so as to leave a gap of 50 μm between the recess and the optical recording member 56. Further, cutting of the end face of the card substrate 57 was carried out so as to ensure the parallelism between each side of the recess 57a and the end face of the card substrate 57.

The optical recording member 56 was fitted into the recess 57a of the card substrate 57, and hot pressing was carried out using a flat press having a size equal to the size of the optical recording member 56 under conditions of 120° C. and 6 kg/cm² for 2.5 sec. This melted the adhesive 55 present on the back side of the optical recording member 56, and, as shown in FIG. 6, bonding could be carried out with the adhesive layer 55a covering the bottom face and end face of the optical recording member 56. Further, since heat was transferred from the top of the transparent protective layer 51 (polycarbonate) toward the polyvinyl chloride located on the side face of the optical recording member 56, sagging of the polyvinyl chloride derived from heat was not observed. In this case, the fitting operation could be simply carried out, and, at the same time, the accuracy of the position of the optical recording member 56 in the recess 57a could be ensured.

The optical card thus prepared was used to write data of 100 tracks by optical card R/W (3B3H-DJ-01, manufactured by Omron Corp.). As a result, the error rate was within $1 \times 10^{-4}$. Further, even after embossing on the card substrate 57, writing and reading by optical card R/W could be successfully carried out. Furthermore, the optical card was tested for bending according to bending test specifications of ISO. As a result, no problem occurred.

Figure 9:
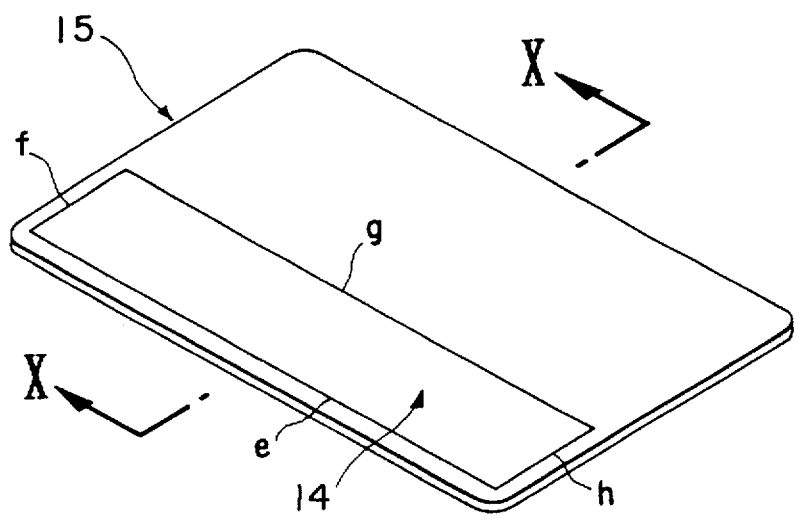
FIG. 9 is a perspective view showing a further embodiment of the optical card according to the present invention.
Figure 10:
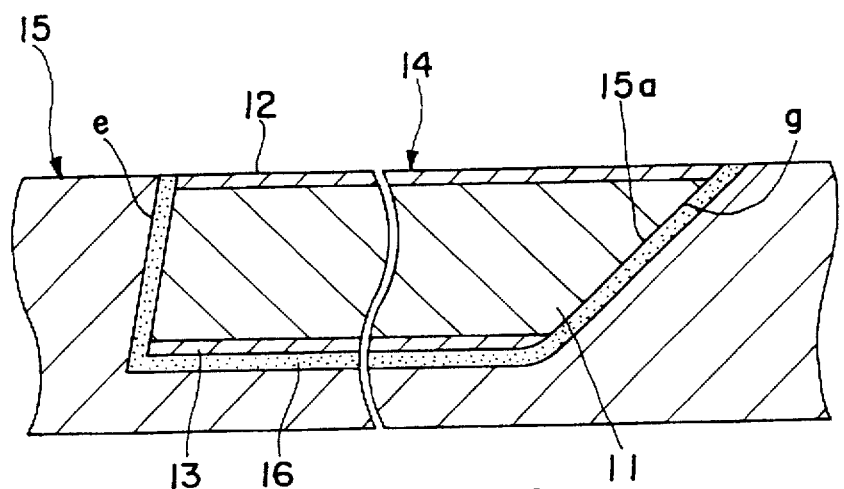
FIG. 10 is a partly enlarged view taken on line X—X of FIG. 9.

FIG. 9 is a perspective view showing the second embodiment of the optical card according to the present invention, and FIG. 10 is a partially enlarged view taken on line X—X of FIG. 9. The optical card shown in the drawings was prepared according to the following procedure.

Figure 11:
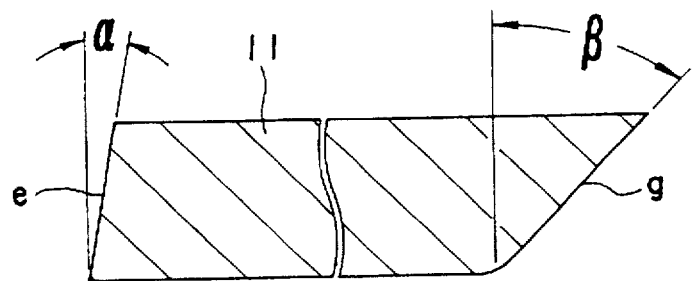
FIG. 11 is a cross-sectional view illustrating a transparent protective layer in an optical recording member of the optical card shown in FIG. 10.

At the outset, as shown in FIG. 11, a 0.4 mm-thick transparent protective layer 11, formed of polymethyl methacrylate, with a pattern face 11a provided on the back side thereof was prepared by casting. In this case, design was carried out so that one side e (lower side) in the longitudinal direction is tapered outwardly at an angle α of −10° to the direction normal to the bottom face with the end face of the other three sides f, g, and h being tapered outwardly at an angle β of 45° and the boundary between the end face and the bottom face of another side g (upper side) in the longitudinal direction was rounded at a radius of curvature of 5 mm. Then, a hard coat agent (UH-001, manufactured by Toray Industries, Inc.) was spin-coated on the side of the transparent protective layer remote from the pattern face 11a to form a surface hard layer 12. Thereafter, TeO$_x$ was sputtered on the pattern face 11a to form an optical recording material layer 13, thereby preparing an optical recording member 14 having a rectangular shape in flat and an outer dimension of 16 mm×84 mm.

Separately, a card substrate 15 was prepared using ABS resin by injection molding. Specifically, a card substrate 15 was prepared which was in a card form having a whole thickness of 0.78 mm and had in a part thereof a recess 15a wherein the side face of one side (lower side) in the longitudinal direction and the side face of the side (left side) adjacent to the lower side were tapered outwardly at an angle of −5° to the direction normal to the bottom face with the other three sides being tapered outwardly at an angle of 45°, the boundary between the side of another side (upper side) in the longitudinal direction and the bottom face was rounded at a radius of curvature of 5 mm, a gap of 50 μm was provided between the side face of the recess and the optical recording member 14 and the depth of the recess was 0.45 mm. In this case, a design was formed by in-mold decorating.

A UV-curable adhesive (863, manufactured by Kyoritsu Chemical Industry Corporation) was dropped in the recess 15a of the card substrate 15, and the optical recording member 14 was fitted into the recess 15a. The whole assembly was pressed by a flat press and irradiated with ultraviolet light to cure an adhesive. Press conditions were set so that, as shown in FIG. 9, the adhesive was spread also on the end face of the optical recording member 14 to form an adhesive layer 16. In this case, the fitting operation could be simply carried out, and, at the same time, the accuracy of the position of the optical recording member 14 in the recess 15a could be ensured.

The optical card thus prepared was used to write data of 100 tracks by optical card R/W (3B3H-DJ-01, manufactured by Omron Corp.). As a result, the error rate was within $1 \times 10^{-4}$. Further, the optical card was tested for bending according to bending test specifications of ISO. As a result, no problem occurred.

The present invention having the above constitution has the following effects.

In each of the end face of the optical recording member and the side face of the recess of the card substrate, one side in the longitudinal direction or each of one side in the longitudinal direction and another side adjacent to the one side is tapered outwardly at an angle of −50 to 3° to the direction normal to the bottom face of the card with the other sides being tapered outwardly at an angle of not less than 3° to the direction normal to the bottom face of the card. This constitution enables the optical recording member to be easily fitted into the recess of the card substrate with high positional accuracy and, at the same time, can minimize the gap between the end face of the optical recording member and the side face of the recess of the card substrate, offering good appearance.

Rounding provided in at least the boundary between the side face of the recess in the side in the longitudinal direction tapered at an angle of not less than 3° and the bottom face of the recess among the boundaries between the side face of the recess and the bottom face of the recess serves to disperse the stress created upon bending of the card, improving the resistance to bending.

Since the adhesive layer between the optical recording member and the card substrate is provided on the end face as well as on the bottom face of the optical recording member, the optical card has improved bending strength.

Since the optical recording member is embedded in a part of the card substrate, the utilization of the remaining area of the card substrate enables the preparation of optical cards in such a form that could not prepared in the prior art, for example, an optical card having a magnetic stripe on both sides thereof, an optical card having an emboss, an optical card wherein an optical recording member and an IC module are provided on different sides of the card, an optical card both sides of which can be subjected to CP working (color portrait working), and an optical card wherein a hologram can be transferred onto both sides thereof.

EXAMPLE C1

At the outset, a hard coat agent (UH-001, manufactured by Toray Industries, Inc.) was spin-coated on one side of a 0.4 mm-thick polycarbonate sheet (a transparent protective layer) to form a surface hard layer. Then, a guide track pattern was formed by 2P method on the other side of the sheet remote from the surface hard layer. TeO$_x$ was sputtered thereon to form an optical recording material layer. Subsequently, an adhesive (PPET-2101, manufactured by Toa Gosei Chemical Industry Co.) was coated using a T-die on the optical recording material layer to form a 50 μm-thick adhesive layer. Then, cutting was carried out so that a wave form (shown in FIG. 12) having a width of 3 mm. a pitch of 4 mm and a corner R of 1 mm was formed on one upper side in the longitudinal direction. the end face was tapered at an angle of 10 and the parallelism to the card track could be ensured, thereby preparing an optical recording member.

Separately, silk offset printing was carried out on each one side of two 0.28 mm-thick core sheets of pearlescent polyvinyl chloride. The two core sheets were put on top of the other so that the non-printed faces faced each other. In this state, the two core sheets were sandwiched between two 0.10 mm-thick overlay sheets, and heat fusing was carried out to prepare a card substrate having a four-layer structure. A magnetic tape of 650 oersted was formed on one side of one of the overlay sheets, while a magnetic tape of 290 oersted was formed on one side of the other overlay sheet. A recess in which the optical recording member is to be embedded was formed in the card substrate by cutting. Specifically, the same wave form as that provided in the optical recording member was formed on one upper side in the longitudinal direction of the recess, and counter sinking was carried out in such a manner that the side face of the recess was tapered outwardly at an angle of 10 to the direction normal to the bottom face of the card and the size of the recess was 50 µm larger than the optical recording member. Further, cutting of the end face of the card substrate was carried out so as to ensure the parallelism between the recess and the end face of the card substrate.

The optical recording member was fitted into the recess of the card substrate, and hot pressing was carried out using a flat press having a size equal to the size of the optical recording member under conditions of 120° C. and 6 kg/cm$^2$ for 2.5 sec. This melted the adhesive, and bonding could be carried out with the melt covering the bottom face and end face of the optical recording member. Further, since heat was transferred from the top of the transparent protective layer (polycarbonate) toward the polyvinyl chloride located on the bottom face of the optical recording member, sagging of the polyvinyl chloride derived from heat was not observed.

The optical card thus prepared was used to write data of 100 tracks by optical card R/W (3B3H-DJ-01, manufactured by Omron Corp.). As a result, the error rate was within $1\times10^{-4}$. Further, even after embossing on the card substrate, writing and reading by optical card R/W could be successfully carried out. Furthermore, the optical card was tested for bending according to bending test specifications of ISO. As a result, no problem occurred.

EXAMPLE C2

A 0.4 mm-thick patterned polymethyl methacrylate (a surface protective layer) was prepared by casting. In this case, design was carried out so that a wave form (shown in FIG. 12) having a width of 3 mm, a pitch of 4 mm and a corner R of 1 mm was formed on the top in the longitudinal direction was formed and the end face was tapered at an angle of 10°. Then, a hard coat agent (UH-001, manufactured by Toray Industries, Inc.) was spin-coated on the side of the surface protective layer remote from the pattern face to form a surface hard layer. TeO$_x$ was sputtered on the pattern face to form an optical recording material layer, thereby preparing an optical recording member.

A card substrate in a 0.78 mm-thick card form having a recess in which the optical recording member is to be embedded was formed using ABS resin by injection molding. The recess was formed so that the depth was 0.45 mm, the same wave form as that of the optical recording member was provided on one upper side in the longitudinal direction, the side face was tapered outwardly at an angle of 10° to the direction normal to the bottom face of the card and the outer dimension was 16 mm×84 mm. In this case, a design was formed by in-mold decorating.

A UV-curable adhesive (863, manufactured by Kyoritsu Chemical Industry Corporation) was dropped in the recess of the card substrate, and the optical recording member was fitted into the recess. The whole assembly was pressed by a flat press and irradiated with ultraviolet light to cure the adhesive. Press conditions were set so that the adhesive was spread also on the end face of the optical recording member.

The optical card thus prepared was used to write data of 100 tracks by optical card R/W (3B3H-DJ-01, manufactured by Omron Corp.). As a result, the error rate was within $1\times10^{-4}$. Further, the optical card was tested for bending according to bending test specifications of ISO. As a result, no problem occurred.

The present invention having the above constitution has the following effects.

In the optical recording member and the recess of the card substrate in which the optical recording member is embedded, at least one side in the longitudinal direction is in a wave form, which serves to disperse the bending stress created upon bending of the card, improving the bending strength.

Since the adhesive layer between the optical recording member and the card substrate is provided on the end face as well as on the bottom face of the optical recording member, the optical card has further improved bending strength.

Since the end face of the optical recording member and the side face of the recess of the card substrate are tapered, the optical recording member can be easily fitted into the recess and, at the same time, the gap between the end face of the optical recording member and the side face of the recess of the card substrate can be minimized, offering good appearance.

Since the optical recording member is embedded in a part of the card substrate, the utilization of the remaining area of the card substrate enables the preparation of optical cards in such a form that could not be prepared in the prior art, for example, an optical card having a magnetic stripe on both sides thereof, an optical card having an emboss, an optical card wherein an optical recording member and an IC module are provided on different sides of the card, an optical card both sides of which can be subjected to CP working, and an optical card wherein a hologram can be transferred onto both sides thereof.

EXAMPLE D1

A hard coat agent (UH-001, manufactured by Toray Industries, Inc.) was spin-coated on one side of a 0.4 mm-thick polycarbonate sheet (a transparent protective layer) to form a surface hard layer. Then, a guide track pattern was formed by 2P method on the other side of the sheet remote from surface hard layer. TeO$_x$ was sputtered thereon to form an optical recording layer. Subsequently, an adhesive (PPET-2101, manufactured by Toa Gosei Chemical Industry Co.) was coated using a T-die on the optical recording layer to form a 50 µm-thick adhesive layer. Then, cutting was carried out in such a manner that the end face was tapered at an angle of 10° and parallel to the card track, thereby preparing an optical recording member having a size of 15 mm in width and 80 mm in length.

Separately, silk offset printing was carried out on each one side of two 0.28 mm-thick core sheets of pearlescent polyvinyl chloride. The two core sheets were put on top of the other so that the non-printed faces faced each other. In this state, the two core sheets were sandwiched between two 0.10 mm-thick overlay sheets, and heat fusing was carried out to prepare a card substrate having a four-layer structure. A magnetic tape of 650 oersted was formed on one side of one of the overlay sheets, while a magnetic tape of 290 oersted was formed on one side of the other overlay sheet. A recess in which the optical recording member is to be embedded was formed in the card substrate by cutting. Specifically, counter sinking was carried out in such a manner that the side face of the recess was tapered outwardly at an angle of 10° to the direction normal to the bottom face of the card and the size of the recess was 50 μm larger than the optical recording member. Further, cutting of the end face of the card substrate was carried out so as to ensure the parallelism between the recess and the end face of the card substrate. In this case, counter sinking was carried out so that the recess was positioned at the center of the card substrate.

The optical recording member was fitted into the recess of the card substrate, and hot pressing was carried out using a flat press having a size equal to the size of the optical recording member under conditions of 120° C. and 6 kg/cm² for 2.5 sec. This melted the adhesive, and bonding could be carried out with the melt covering the bottom face and end face of the optical recording member. Further, since heat was transferred from the top of the transparent protective layer (polycarbonate) toward the polyvinyl chloride located on the bottom face of the optical recording member, sagging of the polyvinyl chloride derived from heat was not observed.

The optical card prepared above was tested for bending according to bending test specifications of ISO. As a result, no problem occurred.

EXAMPLE D2

A 0.4 mm-thick patterned polymethyl methacrylate (a surface protective layer) was prepared by casting. In this case, design was carried out so that the end face was tapered at an angle of 10°. Then, a hard coat agent (UH-001, manufactured by Toray Industries, Inc.) was spin-coated on the side of the surface protective layer remote from the pattern face to form a surface hard layer. TeO$_x$ was sputtered on the pattern face to form an optical recording layer, thereby preparing an optical recording member. The size of the optical recording member was 10 mm in width and 50 mm in length.

Separately, a card substrate in a 0.78 mm-thick card form having a recess in which the optical recording member is to be embedded was formed using ABS resin by injection molding. The recess was formed so that the depth was 0.45 mm, the side face was tapered outwardly at an angle of 10° to the direction normal to the bottom face of the card as in the case of the optical recording member. Further, a design was provided by in-mold decorating. As shown in FIG. 28, the recess was formed in a position which was substantially symmetrical with respect to the center line in the longitudinal direction of the card substrate and closer to one short side than the other short side.

A UV-curable adhesive (863, manufactured by Kyoritsu Chemical Industry Corporation) was then dropped in the recess of the card substrate, and the optical recording member was fitted into the recess. The whole assembly was pressed by a flat press and irradiated with ultraviolet light to cure the adhesive. Press conditions were set so that the adhesive was spread also on the end face of the optical recording member. Further, an IC module was embedded in a position adjacent to the optical recording member.

The optical card thus prepared was tested for bending according to bending test specifications of ISO as in the case of the above examples. As a result, no problem occurred.

What is claimed is:

1. An optical card comprising: a card substrate having a recess; and an optical recording member comprising, in the following order, a surface hard layer, a transparent protective layer, a pattern layer, and an optical recording material layer, the optical recording member being embedded in the recess through an adhesive layer so that the optical recording material layer is in contact with the adhesive layer wherein,
    at least one side in the longitudinal direction of each of the optical recording member and the recess of the card substrate is in a wave form.

2. The optical card according to claim 1, wherein the adhesive layer between the optical recording member and the card substrate is provided on the side faces and the bottom face of the optical recording member.

3. The optical card according to claim 1, wherein both the side faces of the optical recording member and the side faces in the recess of the card substrate are tapered.

4. The optical card according to claim 1, wherein the side faces of the optical recording member and the recess of the card substrate have been worked by cutting.

5. The optical card according to claim 1, wherein the optical recording member and the card substrate have been prepared by injection or cast molding.

6. The optical card according to claim 1, further comprising a magnetic stripe provided on at least one side of the card substrate, which side is the same as or opposite to the side on which the optical recording member is provided.

7. The optical card according to claim 1, further comprising an IC module provided on one side of the card substrate which is the same as or opposite to the side on which the optical recording member is provided.

8. The optical card according to claim 1, wherein an emboss is provided in an area other than the area where the optical recording member is present.

9. The optical card according to claim 1, wherein the hardness of the optical recording member is substantially the same as that of the card substrate.

10. The optical card according to claim 1, wherein the optical recording member is embedded in a position through which at least one of a center line in the direction of a longer side of the card and a center line in the direction of a shorter side passes.

* * * * *